(12) United States Patent
Akkil et al.

(10) Patent No.: US 12,229,354 B2
(45) Date of Patent: Feb. 18, 2025

(54) CONTEXT-SENSITIVE CUSTOMIZATION OF REMOTE-CONTROL UNIT

(71) Applicant: Merlyn Mind, Inc., New York, NY (US)

(72) Inventors: Deepak Akkil, Helsinki (FI); Prasenjit Dey, Kolkata (IN); Ravindranath Kokku, Yorktown Heights, NY (US); Shom Surendran Ponoth, Irvine, CA (US); Hélène Irene Alonso, New York, NY (US); Sean O'Hara, fort Montgomery, NY (US); Satya V. Nitta, Cross River, NY (US)

(73) Assignee: MERLYN MIND, INC., New York, NY (US)

( * ) Notice: Subject to any disclaimer, the term of this patent is extended or adjusted under 35 U.S.C. 154(b) by 0 days.

(21) Appl. No.: 18/073,938

(22) Filed: Dec. 2, 2022

(65) Prior Publication Data

US 2024/0201804 A1 Jun. 20, 2024

(30) Foreign Application Priority Data

Nov. 18, 2022 (IN) .............................. 202241066307

(51) Int. Cl.
*G06F 3/038* (2013.01)
*G06F 3/0346* (2013.01)
(Continued)

(52) U.S. Cl.
CPC ............ *G06F 3/038* (2013.01); *G06F 3/0346* (2013.01); *G06F 3/0484* (2013.01);
(Continued)

(58) Field of Classification Search
CPC ...... G06F 3/038; G06F 3/0346; G06F 3/0484; G06F 3/0488; G06F 3/14; G06F 3/167;
(Continued)

(56) References Cited

U.S. PATENT DOCUMENTS 7,548,246 B2   6/2009   Huang et al.
8,713,614 B2   4/2014   Dodd
(Continued)

FOREIGN PATENT DOCUMENTS

CN        111968360 A     11/2020

OTHER PUBLICATIONS

U.S. Appl. No. 18/331,024, filed Jun. 7, 2023.
(Continued)

*Primary Examiner* — Richard J Hong
(74) *Attorney, Agent, or Firm* — Duane Morris LLP

(57) ABSTRACT

A method of customizing contextual controls of a remote-control unit (RCU) having a plurality of user interface elements is disclosed. A processor within the RCU receives context information from an integrated output device that includes an output mechanism, the context information being related to an active application being run on the integrated output device and an active object being presented by the active application. The processor determines a set of actions that can be performed on the active object within the active application. The processor dynamically maps actions to user interface elements of the RCU based on the context information. The processor receives a selection of a user interface element and sends a request from the RCU to the integrated output device specifying an action mapped to the user interface element to be performed on the active object and the active application.

19 Claims, 15 Drawing Sheets

(51) Int. Cl.
  *G06F 3/0484* (2022.01)
  *G06F 3/0488* (2022.01)
  *G06F 3/14* (2006.01)
  *G06F 3/16* (2006.01)
(52) U.S. Cl.
  CPC .............. *G06F 3/0488* (2013.01); *G06F 3/14* (2013.01); *G06F 3/167* (2013.01); *G06F 2203/0383* (2013.01)
(58) Field of Classification Search
  CPC .. G06F 2203/0383; G06F 16/65; G06F 3/011; G06F 3/048; H04N 21/42221; H04N 21/42224; H04N 21/42209; H04N 21/43637; H04N 21/41265; H04M 1/72454; H04B 1/202
  See application file for complete search history.

(56) References Cited

U.S. PATENT DOCUMENTS

| | | |
|---|---|---|
| 9,525,736 B2 | 12/2016 | Wang |
| 9,807,446 B2 | 10/2017 | Sirpal et al. |
| 9,821,457 B1 | 11/2017 | Laurent et al. |
| 9,934,679 B2 | 4/2018 | Liu et al. |
| 10,311,714 B2 | 6/2019 | Huang et al. |
| 10,332,516 B2 | 6/2019 | Shah et al. |
| 2006/0004834 A1* | 1/2006 | Pyhalammi ...... H04N 21/41265 707/999.102 |
| 2007/0229465 A1* | 10/2007 | Sakai ..................... H04B 1/202 345/173 |
| 2010/0317332 A1* | 12/2010 | Bathiche .......... H04N 21/43637 455/418 |
| 2011/0191516 A1* | 8/2011 | Xiong ..................... G06F 3/048 345/173 |
| 2012/0274863 A1* | 11/2012 | Chardon ................ G06F 16/65 348/734 |
| 2013/0321268 A1* | 12/2013 | Tuck ....................... G06F 3/011 345/157 |
| 2014/0181715 A1* | 6/2014 | Axelrod ............ H04M 1/72454 715/771 |
| 2015/0113567 A1* | 4/2015 | Scheer ............. H04N 21/42209 725/44 |
| 2015/0382066 A1* | 12/2015 | Heeter ............. H04N 21/42224 386/234 |
| 2017/0070767 A1* | 3/2017 | Heeter ............. H04N 21/42221 |
| 2021/0342020 A1 | 11/2021 | Jorasch et al. |
| 2021/0342785 A1 | 11/2021 | Mann et al. |
| 2021/0373676 A1 | 12/2021 | Jorasch et al. |
| 2021/0382675 A1 | 12/2021 | Sharma et al. |
| 2023/0083688 A1 | 3/2023 | Janakiraman et al. |
| 2023/0086906 A1 | 3/2023 | Tang et al. |

OTHER PUBLICATIONS

U.S. Appl. No. 18/073,942, filed Dec. 2, 2022.
Non-Final Office Action, May 13, 2024.
U.S. Appl. No. 18/073,942, Final Office Action, Sep. 5, 2024.

* cited by examiner

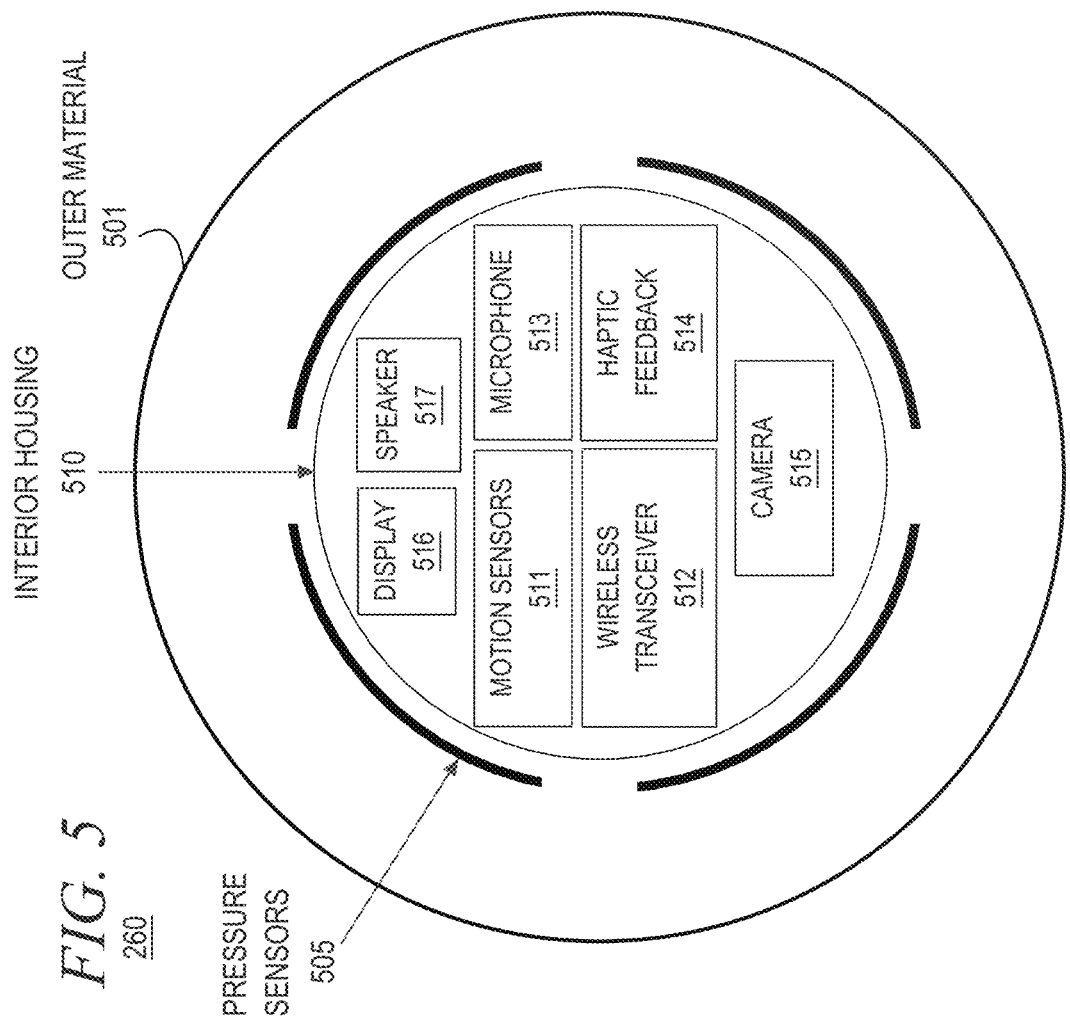

CONTEXT-SENSITIVE CUSTOMIZATION OF REMOTE-CONTROL UNIT

FIELD OF THE INVENTION

The present disclosure relates to remote control of computer applications and media presentations. More specifically, the present disclosure relates to context-sensitive customization of a remote-control unit.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Human-computer interaction through advanced user interfaces can take many forms and use many sources of information. In settings such as classrooms, various computer applications for teaching and learning can be controlled by one or more devices. Often, a presenter uses a computing device, such as a laptop computer, to control presentation of the content generated by a computer application. For example, presentation software can be used to display slides of content on a screen, such as a computer monitor, television, or overhead projector. As another example, a presenter can present video content, image slideshows, web content, or other documents to an audience.

Remote-control units can be used to control the presentation of content. These remote-control units typically have fixed control buttons with limited functionality. For instance, a remote-control unit may have buttons for forward, back, pause, play, etc. The commands transmitted by remote-control units do not change. It is up to the device or application receiving the commands to interpret them with respect to the content being presented. Remote-control units lack adaptability for environments in which various forms of content can be presented, particularly multi-media content for which controls can change based on the active content being presented. Furthermore, some applications or content do not readily adapt to known fixed commands.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 5 is a diagram illustrating components of a remote-control unit having a specialized form factor in accordance with an illustrative embodiment.

DETAILED DESCRIPTION

Figure 1:
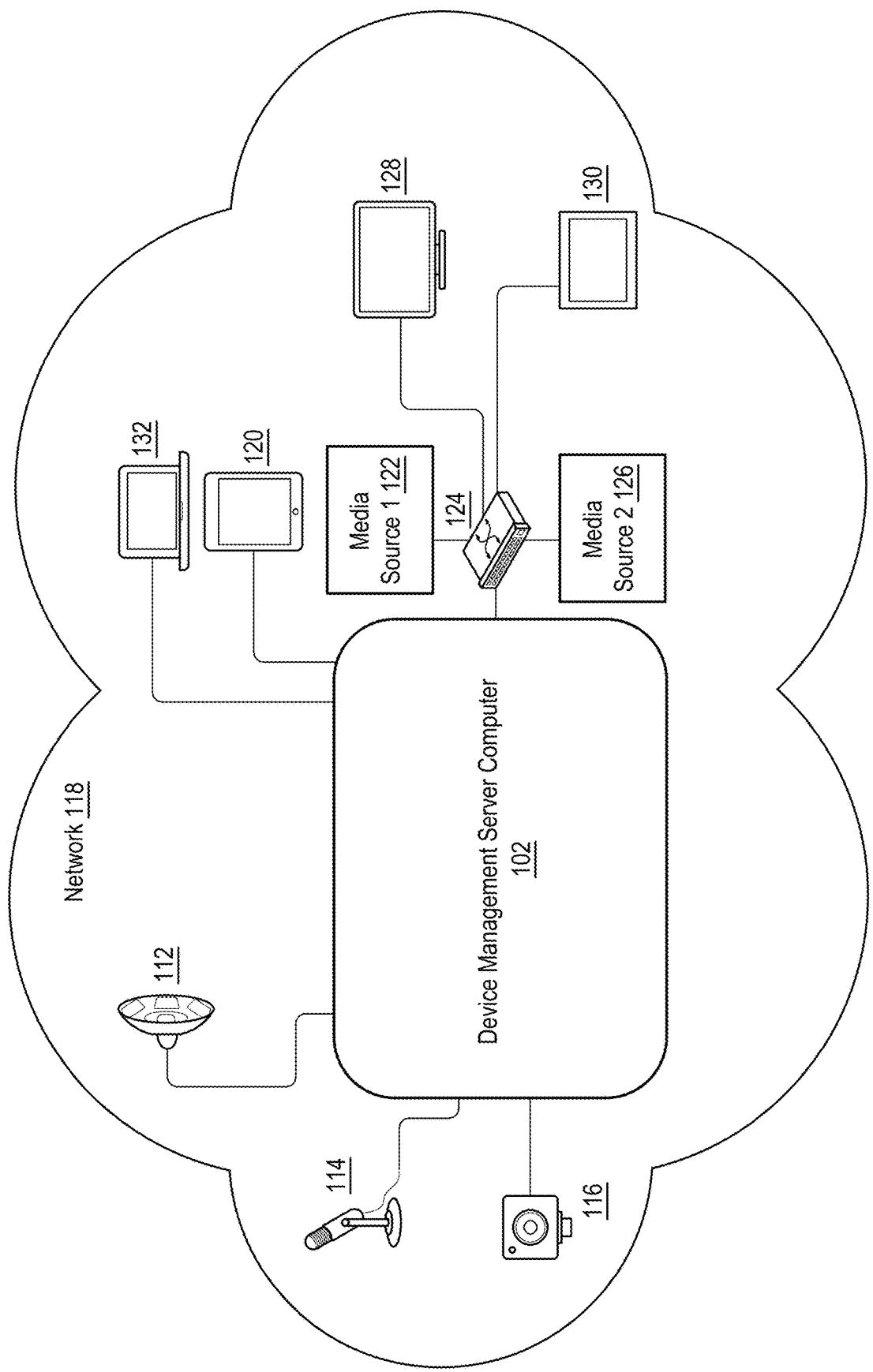
FIG. 1 illustrates an example networked computer system in which various embodiments may be practiced.

In the following description, for the purposes of explanation, numerous specific details are set forth in order to provide a thorough understanding of the present invention. It will be apparent, however, that the illustrative embodiments may be practiced without these specific details. In other instances, well-known structures and devices are shown in block diagram form in order to avoid unnecessarily obscuring the example embodiments.

Embodiments are described in sections below according to the following outline:
  1. General Overview
  2. Example Computing Environments
  3. Example Computing Devices 4. Example Computing Components
5. Functional Descriptions
　5.1. User Management
　5.2. Device Pairing and Management
　5.3. Context-Sensitive Customization
6. Example Processes
7. Hardware Implementation
8. Extensions and Alternatives

1. GENERAL OVERVIEW

A system for context-sensitive customization of remote-control units (RCUs) is disclosed. In some environments, a user may use multiple devices to manage computer applications via user interfaces. During activities in a physical room, a user may need to switch from one computer application to another. For example, a user can transition from showing a slideshow presentation to playing a video and then decide to browse a website including a map or other content. Furthermore, computer applications including control layers or output layers can have complex structure, such as searches within zoomed-in views or panes within frames. It is inconvenient for the user to have to perform configuration operations on a single RCU to enable control of different computer applications, which disrupts the flow of the activities and can result in the audience losing interest. The illustrative embodiments provide automatic, context-sensitive customization of the RCU to enable the user to transition seamlessly between computer applications while still utilizing a single RCU with familiar user interface elements.

Content presentation can be controlled using an RCU with software user interface elements or physical controls. In some embodiments, an RCU is paired to a dongle coupled to an integrated output device (IOD) for controlling content being presented on the IOD. In one embodiment, an IOD integrates a processor and memory with an output mechanism, such as a screen or a speaker. The dongle collects context information from the IOD regarding computer applications installed or running on the IOD and sends commands to the IOD to control those computer applications based on communication with the RCU. The dongle sends the context information to the RCU and receives commands from the RCU according to a communication protocol. The context information can specify information at different granularities, including an active application being executed on the IOD, such as a player of a slide show, an active object being operated on by the application, such as a slide show, an active object or unit that is considered current, such as the current slide, and an active item within the active unit that is in focus or being selected, such as a bar graph within the slide. This enables the RCU to intelligently configure user input elements of the RCU based on the application being run on the IOD and the content being presented. Specifically, the configuration could be based on how this user or other users generally access the computer application, how one or more users generally use the RCU, or how the activities are going in the physical room. The RCU can perform this configuration automatically without the user having to manually switch modes or reassign actions to user interface elements. The user can simply use the RCU in a natural manner, selecting user interface elements as they are expected to be configured in different contexts that are most convenient to the user, without having to perform any setup operations when the context information from the same IOD changes or when the RCU connects to another IOD.

In some embodiments, the RCU is programmed to receive the context information from the IOD via the dongle. The communication could be performed using simple wireless transmission, such as radio-frequency signals. The RCU is programmed to determine a set of actions that can be performed on the active object within the active application and dynamically map one or more actions to user interface elements of the RCU based on the context information. In one embodiment, the user interface elements are physical control elements, such as buttons, switches, rockers, dials, etc. The user interface elements could also be expressed through other physical features of the RCU, such as its position, orientation, or surface pressure. For example, waving the RCU and squeezing the RCU are different ways of interacting with the RCU. In another embodiment, the user interface elements are software user interface elements to be actuated via a touchscreen, for example. For instance, for a particular computer application, the RCU could be configured to determine the two most-used functions across a group of users or for the current user of RCU. The RCU could be configured to similarly determine the two most-used user interface elements of the RCU. The two most-used functions of the computer application could then be mapped to the two most-used user interface elements of the RCU. In response to a user selection of a user interface element, the RCU sends one or more commands to the dongle specifying an action mapped to the selected user interface element to be performed by the active application on the active object. This allows the RCU to automatically configure user interface elements to instruct actions that can be performed by the active application on the active objects. Thus, the RCU can adapt to applications and content that may not have been anticipated by the user ahead of time while still allowing intuitive and, thus, easy use of the RCU.

In some embodiments, the active application can present multi-media content such that the object being presented includes one or more embedded objects having different forms of content. For example, a presentation document can include text and have embedded video and audio content. Complex document structures are typically designed with a mouse and keyboard in mind, and it is often difficult to control such content using an RCU. Software installed on the IOD or the dongle can identify embedded objects within the object being presented and determine which form of content has focus within the active application. The context information can specify the object being presented, the embedded objects within the object being presented, and the embedded object that is active in the application. The RCU can be configured to map commands to navigate between embedding layers to user interface elements, which when chosen trigger sending commands to the dongle for execution by the IOD. Such commands enable changing focus, for example, between different objects having the same position within the computer application rather than different objects in different positions within the computer application. Thus, the RCU can adapt to complex presentation content structures, which allows the presenting user to navigate from one object to another without interrupting the presentation to manually reconfigure the RCU.

Thus, the illustrative embodiments enable a user to transition between computer applications quickly and seamlessly and to control and manage different modes of content using a single RCU. The illustrative embodiments provide RCUs that are highly usable and adaptive to complex situations and environments, thus allowing the user to more effectively present content to an audience.

2. EXAMPLE COMPUTING ENVIRONMENTS

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a device management server computer 102 ("server") and an I/O system, including one or more integrated devices 132 and 120 which integrate input and output capabilities, a media switch 124, one or more input devices 114, 116, 122, and 126, and one or more output devices 112, 128, and 130. The server can be communicatively coupled with each component of the I/O system via one or more networks 118 or cables, wires, or other physical components.

In some embodiments, the server 102 broadly represents one or more computers, virtual computing instances, and/or instances of a server-based application that is programmed or configured with data structures and/or database records that are arranged to host or execute functions including but not limited to managing the I/O system, collecting action data, identifying compound actions, generating user interfaces for executing the compound actions, providing the user interfaces to a client device and/or causing execution of a compound action on one or more computer devices. In certain embodiments, the server 102 can comprise a controller that provides a hardware interface for one or more components in the I/O system. For example, the server 102 can have an audio controller that communicates with I/O devices that handle audio data or a camera controller that specifically communicates with a camera. The server 102 is generally located in a physical room with the I/O system to help achieve real-time response.

In some embodiments, the I/O system can comprise any number of input devices, output devices, or media switches. An input device typically includes a sensor to receive data, such as a keyboard to receive tactile signals, a camera to receive visual signals, or a microphone to receive auditory signals. Generally, there can be a sensor to capture or measure any physical attribute of any portion of the physical room. Additional examples of a physical attribute include smell, temperature, or pressure. There can also be sensors to receive external signals, such as a navigation device to receive satellite GPS signals, a radio antenna to receive radio signals, or a set-top box to receive television signals. These sensors do not normally receive signals generated by a user but may still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Examples of an integrated device include a desktop computer, laptop computer, tablet computer, smartphone, or wearable device. A media switch typically comprises a plurality of ports into which media devices can be plugged. The media switch is configured to then re-direct data communicated by media sources to output channels, thus "turning on" or "activating" connections with specific output devices in accordance with instructions from the server 102. In general, one or more of the input devices can be selected to capture participant actions in addition to or instead of other activities in the physical room. The selected input devices can be dedicated to such use or can concurrently capture other activities in the physical room. For example, the microphone capturing spoken words from a participant can be connected to a speaker to broadcast the spoken words, and the microphone can also capture other sounds made in the physical room.

In this example, the media switch 124 can comprise many ports for connecting multiple media and I/O devices. The media switch 124 can support a standard interface for media transmission, such as HDMI. The media devices 122 and 126 communicating with the media switch 124 can be video sources. The server 102 can serve as an intermediary media source to the media switch 124 by converting data received from certain input devices to a format compatible with the communication interface supported by the media switch 124. The media devices 128 and 130 communicating with the media switch 124 can include a digital audio device or a video projector, which may be similar to other output devices but being specifically compatible with the communication interface supported by the media switch 124. The additional input devices 114 and 116 can be a microphone and a camera. The integrated devices 132 and 120 can be a laptop computer and a mobile phone. The server 102 and the components of the I/O system can be specifically arranged in the physical room to maximize the communication efficiency and overall performance.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive tracked action data associated with one or more users from one or more computer devices, which could include one of the integrated devices 120 or 132. The tracking of actions and generation of tracked action data can involve receiving data regarding what is happening in the physical room by an input device and identifying and interpreting a command issued by a participant in the physical room from the data by a computing device coupled to the input device. The identification and interpretation of a command performed via physical interaction with an input device, such as a keyboard or a touchpad, for example, could be straightforward. The identification and interpretation of a command in general can be performed using existing techniques known to someone skilled in the art, such as the one described in U.S. Pat. No. 10,838,881.

In some embodiments, the server 102 is programmed to process the tracked actions associated with one or more users to identify compound actions that correspond to sequences of actions performed by a user. The server 102 is further programmed to generate instructions which, when executed by a computing device, cause an output device coupled to the computing device to present deep links each representing a compound action and usable by the user to execute the compound action in one step.

In some embodiments, the server 102 is programmed to receive invocation data indicating an invocation of a deep link from an input device or an integrated device. The server is further programmed to cause performance of the corresponding compound action, which corresponds to a sequence of actions. For example, the server 102 can send instructions for performing an action of the sequence of actions to any device required to perform the action. When the sequence of actions can all be performed by the input device or a coupled integrated device or output device, sending any invocation data to the server 102 can be optional.

3. EXAMPLE COMPUTING DEVICES

Figure 2:
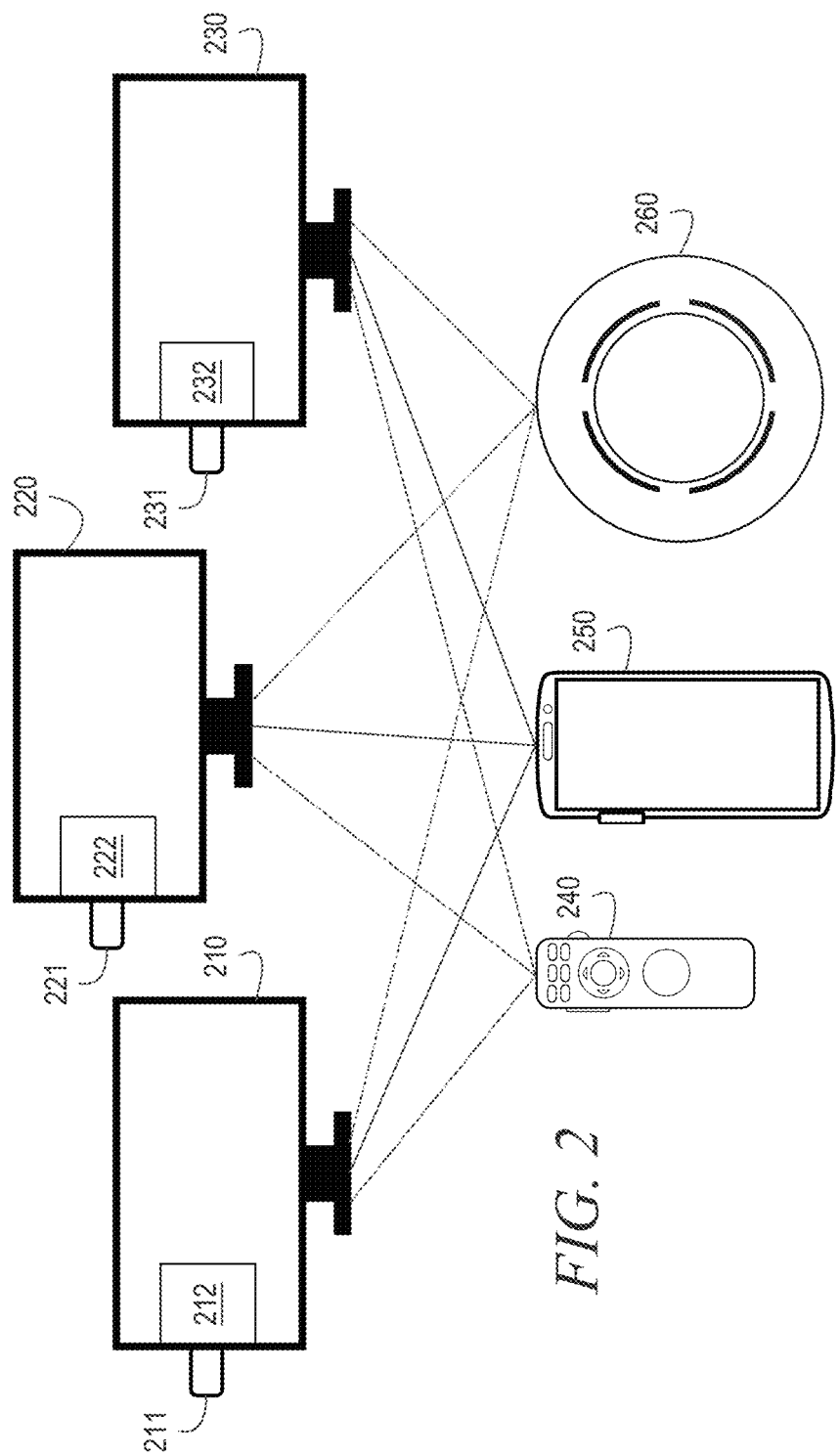
FIG. 2 illustrates an example content presentation environment with integrated output devices paired to remote-control units in which aspects of the illustrative embodiments may be implemented.

FIG. 2 illustrates an example content presentation environment 200 with IODs paired to RCUs in which aspects of the illustrative embodiments may be implemented. FIG. 2 is shown in simplified, schematic format for purposes of illustrating a clear example and other embodiments may include more, fewer, or different elements. In some embodiments, the content presentation environment 200 includes a plurality of integrated output device (IODs) 210, 220, 230, each coupled to a respective one of the dongles 211, 221, 231, and a plurality of remote-control units (RCUs) 240, 250, 260. The IODs 210, 220, 230 can be examples of media devices 128 and 130 or integrated devices 132 and 120 in FIG. 1, for example. In some embodiments, the RCUs 240, 250, 260 can communicate with the devices 120, 128, 130, 132 in FIG. 1 via the device management server computer 102. In other embodiments, the RCUs 240, 250, 260 can communicate directly with devices 120, 128, 130, 132 or via dongles 211, 221, 231, as will be described in further detail below. Each RCU could be considered as an input device, an integrated input device, or an integrated I/O device.

In some embodiments, each of the dongles 211, 221, 231 is coupled to its respective IOD 210, 220, 230 via a physical interface port. In one example embodiment, each of the dongles 211, 221, 231 is coupled to its respective IOD via a Universal Serial Bus (USB) interface port. In another example embodiment, each of the dongles 211, 221, 231 is coupled to its respective IOD via a High-Definition Media Interface (HDMI™) port. HDMI is a trademark of HDMI Licensing Administrator, Inc. in the United States, other countries, or both.

Each of the RCUs 240, 250, 260 can be paired to one or more of the IODs 210, 220, 230 via the dongles 211, 221, 231, and vice versa. The dongles 211, 221, 231 have a processor, a memory, and other resources for executing software instructions. In other embodiments, the dongles can include special-purpose hardware for performing some or all of the functions of the dongles.

In some embodiments, the RCUs 240, 250, 260 and the dongles 211, 221, 231 communicate using a radio frequency signal. The RCUs 240, 250, 260 and the dongles 211, 221, 231 are configured to generate and interpret specialized signals for communicating context information and commands. For example, context information can include a hierarchy of embedded objects or an organized set of items, including all applications installed on a given IOD. Thus, the context information can be communicated as a multi-part signal, where the first part based on the length or some other signal attributes would identify the active application, the second part the active object, and so forth. The signal format can become even more complex when there are multiple objects at the same position. Thus, in some embodiments, the RCUs and dongles or IODs communicate with a proprietary, predetermined communication protocol that specifies how context information is to be formatted in the wireless signals.

In an example embodiment, the RCUs 240, 250, 260 pair to the dongles 211, 221, 231 via a wireless network protocol, such as communication protocols used by the Bluetooth® short-range wireless technology standard. BLUETOOTH is a registered trademark of the Bluetooth Special Interest Group (SIG), Inc. in the United States, other countries, or both. The RCUs 240, 250, 260 can be paired to the IODs 210, 220, 230 in a one-to-one, one-to-many, or many-to-many arrangement. For example, RCU 240 can be paired to only IOD 210, to IOD 210 and IOD 220, or to all IODs 210, 220, 230. As another example, IOD 220 can be paired to only one RCU, such as RCU 250, to RCU 240 and RCU 250, or to all RCUs 240, 250, 260.

In an alternative embodiment, one or more of the IODS 210, 220, 230 can include wireless communication interfaces, and the RCUs 240, 250, 260 can communicate directly with the IODs without a dongle. For example, many modern devices can connect to a local area network or the Internet via wireless networking protocols and can pair with devices using the Bluetooth® short-range wireless technology standard.

In one embodiment, each of the IODs 210, 220, 230 is configured with an operating system and an application platform for executing applications for presenting content. For example, IOD 210 can be a smart TV device, also referred to as a connected TV. In some example embodiments, each of the IODs 210, 220, 230 runs an operating system, such as the Android™ platform, the tvOS™ software platform for television, or the Roku® operating system. In some example environments, the application platform can be, for example, the Roku® smart TV application platform, the webOS application platform, the tvOS® software platform for television, or the Google Play™ store. ANDROID and GOOGLE PLAY are trademarks of Google LLC in the United States and other countries. TVOS is a trademark of Apple Inc. in the United States and other countries and regions. ROKU is a trademark of Roku, Inc. in the United States and other countries. In some embodiments, one or more of IODs 210, 220, 230 are capable of communicating directly with RCUs 240, 250, 260 via wireless protocols, such as the Bluetooth® short-range wireless technology standard or the IEEE 802.11 family of standards.

In one example embodiment, each of the IODs 210, 220, 230 is also configured with a companion application 212, 222, 232 for communicating with the dongle to send context information to the RCUs 240, 250, 260 and to receive commands from the RCUs 240, 250, 260. In one embodiment, the companion application 212, 222, 232 is a device driver, which includes software that operates or controls a particular type of device that is attached to the IOD 210, 220, 230 via a USB interface port, for example. In this case, such a particular type of device could be one of the dongles 211, 221, and 231. A device driver provides a software interface to hardware devices, enabling operating systems and other computer programs to access hardware functions without needing to know precise details about the hardware being used. A device driver communicates with the device through the computer bus, such as a USB interface port, to which the hardware connects. When a calling application (e.g., an application being executed to present content, a supplemental companion application that runs in the background, or a part of the operating system) being executed on an IOD invokes a routine in the device driver, the device driver issues commands to the dongle. In response to the dongle sending data back to the device driver, the device driver can invoke routines in the original calling application.

In one embodiment, companion applications 212, 222, 232 can be background applications that stay resident in memory and collect information from the operating system and other applications running on the IODs 210, 220, 230. The background applications can be specifically designed to send information to RCUs 240, 250, 260 and receive commands from RCUs 240, 250, 260 to implement aspects of the illustrative embodiments to be described in the description below. The background applications can use application programing interfaces (APIs) of other applications executing on the IODs 210, 220, 230 to receive data from or send data to the other applications. An application programming interface (API) is a way for two or more computer programs to communicate with each other. It is a type of software interface, offering a service to other pieces of software. An API specification defines these calls, meaning that it explains how to use or implement them. In other words, the API specification defines a set of actions that can be performed by the application. Thus, the API of an application executing on an IOD can have methods or subroutines for extracting context information, such as the name of the application, the filename of a file being operated on by the application, and a position in the file that is being presented by the application. The API of an application can also have methods or subroutines for performing a set of actions. For example, the API of a presentation program can have methods or subroutines for requesting the name of the application, the name of the file being operated on by the application, and a current slide being presented. The API of an audio player application can have methods or subroutines for pausing, playing, skipping back, skipping forward, playing the next file in a playlist, etc. Background applications can make calls to implement the API of an application to request the context information or to send commands to control content presentation. In one embodiment, companion applications 212, 222, 232 can be implemented as plugins or extensions of applications executing on the IODs 210, 220, 230. For example, the companion applications 212, 222, 232 can be web browser extensions or plugins that are specific to a particular suite of office applications.

In some embodiments, one or more of the IODs 210, 220, 230 are configured with a platform for executing applications, such as a suite of office applications. In one embodiment, a web browser is installed on an IOD, and the applications are executed as services hosted by a web server. For instance, the applications can be office applications that are part of a web-based suite of office tools. Thus, the web browser is an application installed on an IOD, which can be executed to provide a platform for running and executing one or more web-based applications.

In some embodiments, dongles 211, 221, 231 are configured to install one or more applications on their respective IODs. In one embodiment, each of the dongles 211, 221, 231, upon insertion into an interface port of the IOD 210, 220, 230, installs or prompts a user to install a respective companion application on the IOD 210, 220, 230. In another embodiment, each of the dongles 211, 221, 231 can install other applications for presenting content, such as presentation software, a web browser, a video or audio program, etc. In an example embodiment, applications installed by a dongle 211, 221, 231 are instrumented with logic for collecting and reporting context information to the dongle 211, 221, 231.

IODs 210, 220, 230 can include other examples of integrated output devices that integrate a processor and memory with an output mechanism. For instance, IODs 210, 220, 230 can include a smart speaker that is capable of being controlled by an RCU 240, 250, 260. A smart speaker is a type of loudspeaker and voice command device with an integrated virtual assistant that offers interactive actions. In this example embodiment, companion applications 212, 222, 232 can be implemented as "skills" or "actions" through a virtual assistant, which provides services that provide information (e.g., weather, movie database information, medical information, etc.) or plays sound files (e.g., music, podcasts, etc.), for example. Other output mechanisms, such as overhead projectors or the like, can be integrated into IODs 210, 220, 230.

In an example embodiment, dongle 211, for example, is a digital media player device, also referred to as a streaming device or streaming box, connected to an HDMI port of the IOD 210. A digital media player device is a type of microconsole device that is typically powered by low-cost computing hardware including a processor and memory for executing applications that present media content on an output device, typically a television. In this example, the dongle 211 can run an operating system, such as the Android™ platform, the tvOS™ software platform for television, or the Roku® operating system. In some example environments, the application platform can be, for example, the Roku® smart TV application platform, the webOS application platform, the tvOS® software platform for television, or the Google Play™ store. In one example, the dongle 211 can also run the companion application 212 such that the output mechanism of the IOD 210 and the dongle 211 combine to provide appropriate services that facilitate activities in the physical room. The RCUs 240, 250, 260 can pair to the dongle 211 and control presentation of content on the output mechanism of the IOD 210 through the dongle 211.

In another example embodiment, dongle 211, for example, is a specialized computing device connected to an HDMI port of the IOD 210. For instance, dongle 211 can be implemented using a single-board computer (SBC) configured with a light-weight operating system and specialized software for implementing applications for presenting content and communicating with RCUs 240, 250, 260. A single-board computer is a complete computer built on a single circuit board, with one or more microprocessors, a memory, input/output (I/O) devices, and other features typical of a functional computer, such as wireless communication technologies. Single-board computers are commonly made as demonstration or development systems, for educational systems, or for use as embedded computer controllers. As a specific example, dongle 211 can be implemented using the Raspberry Pi™ single-board computer running the Linux™ operating system. RASPBERRYPI is a trademark of the Raspberry Pi Foundation in the United States, other countries, or both. LINUX is a trademark of the Linux foundation in the United States and other countries.

In one embodiment, RCU 240 is an electronic device used to operate another device using physical control elements via wireless communication. In an example embodiment, the RCU 240 communicates with one or more of dongles 211, 221, 231 via radio frequency signals, the Bluetooth® short-range wireless technology, or other communication protocols or standards. In this example, the RCU 240 pairs to one or more of the IODs 210, 220, 230 via their respective dongles. The physical control elements can include buttons, scroll wheels, dials, rocker switches, etc.

Figure 3:
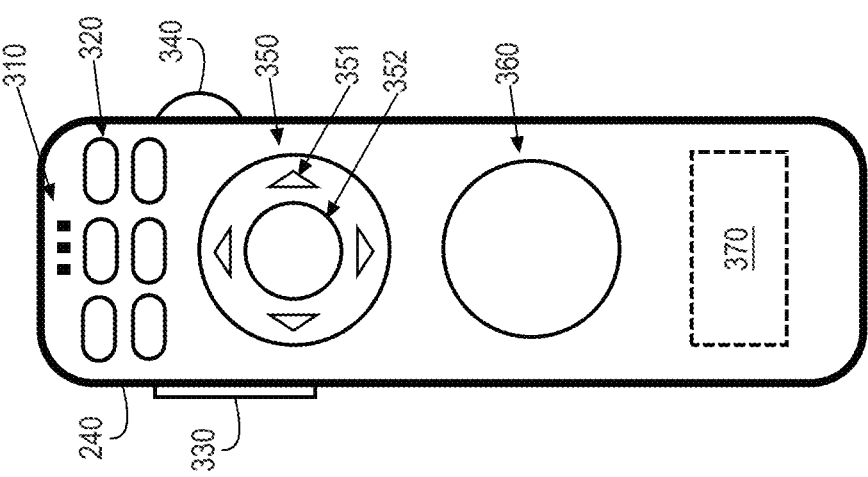
FIG. 3 is a diagram illustrating components of a remote-control unit with physical control elements in accordance with an illustrative embodiment.

FIG. 3 is a diagram illustrating components of a remote-control unit 240 with physical control elements in accordance with an illustrative embodiment. RCU 240 includes microphone 310, physical buttons 320, rocker switch 330, scroll wheel 340, directional buttons 350, dial 360, and motion sensors 370. Physical buttons 320 can be mapped to different actions, such as executing particular applications, opening particular objects or files, activating sensors (e.g., a microphone), etc. In some embodiments, the physical buttons 320 are labeled with certain default actions, such as a microphone graphic for speech input, predetermined applications, etc.

Rocker switch 330 is configured to rock up or down on the side of RCU 240. Scroll wheel 340 is configured to rotate such that a user's thumb or finger moves in an up and down motion. Rocker switch 330 and scroll wheel 340 can be mapped to operations that logically have an up or down action, such as volume up, volume down, scroll up, scroll down, etc. In some embodiments, the rocker switch 330 and scroll wheel 340 are generally associated with up and down actions.

Directional buttons 350, sometimes referred to as a directional bad or D-pad, includes left, right, up, and down buttons 351 and a selection button 352. In some implementations directional buttons 350 can be configured to accept diagonal direction inputs as well, such as upward-left or downward-right. In some example embodiments, a user can use the directional buttons 351 to move between objects on a screen of the IOD and use the selection button 352 to select an object. In other embodiments, the directional buttons 351 can be mapped to particular actions, such as scrolling up, down, left, or right, increasing or decreasing the volume, skipping forward or back in audio or video content, next slide or previous slide, zoom in or out, moving an object on the screen, etc. In some embodiments, the directional buttons 351 are associated with directional actions, and in particular the selection button 352 is associated with a selection action.

The dial 360 can be mapped to operations that indicate rotating actions or left/right actions, such as rotating an object on the display screen of an IOD, scrolling left and right, increasing or decreasing the volume, zooming in or out, etc. In some embodiments, the dial 360 is associated with rotating actions or left and right actions.

The microphone 310 is configured to be activated for sound input or deactivated. In some embodiments, a button, such as one of physical buttons 320, can be selected to activate or deactivate the microphone 310. For example, a user can activate the microphone 310 to enter speech commands. In some embodiments, the microphone 310 is associated with actions for which there are predetermined speech commands. In another embodiment, the microphone 310 can continuously listen to monitor for a waking command to transition from a monitoring mode to a speech input mode.

The motion sensors 370 include sensors that detect movement of the RCU 240. In one example embodiment, the motion sensors 370 include accelerometers that detect movement in lateral, longitudinal, vertical, or other directions and gyroscope devices that detect rotation about lateral, longitudinal, vertical, or other axes. Thus, in this example, the motion sensors 370 include three accelerometers and three gyroscope devices to detect movement and rotation in three dimensions. In some embodiments, the RCU 240 can be calibrated with respect to a reference location such that the motion sensors 370 can track a location of the RCU 240 within a predetermined space, such as a classroom for example. In other embodiments, the motion sensors 370 can be used to detect motion gestures, such as flick right/left/up/down, wave, circle, checkmark, etc. In some embodiments, the motion sensors 370 are associated with actions for which there are predetermined motion gestures.

In one embodiment, RCU 250 is a touchscreen device, such as a smartphone device or tablet computer, for example, configured with an application for implementing functionality for controlling one or more of IODs 210, 220, 230. In one embodiment, the RCU 250 communicates with one or more of dongles 211, 221, 231 using wireless communication protocols used by the Bluetooth® short-range wireless technology standard or wireless network protocols based on the IEEE 802.11 family of standards, for example. In this example, RCU 250 pairs to one or more of IODs 210, 220, 230 via their respective dongles. In an embodiment, RCU 250 includes software user interface elements, such as touchscreen controls, voice commands, movement gestures (e.g., shaking, pointing, etc.), touchscreen gestures or other input captured by a camera, etc.

Figure 4:
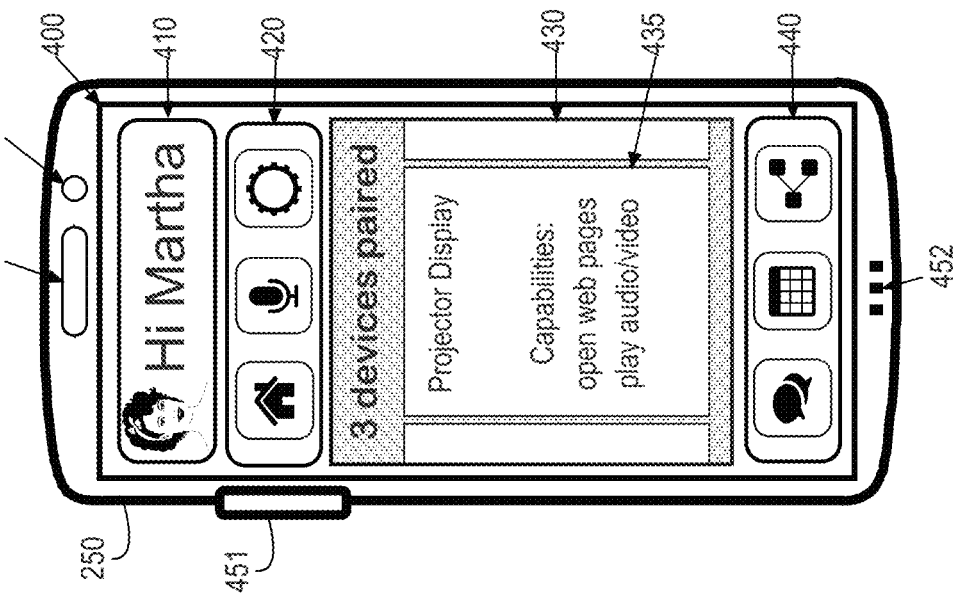
FIG. 4 is a diagram illustrating components of a remote-control unit with touchscreen user interface elements in accordance with an illustrative embodiment.

FIG. 4 is a diagram illustrating components of a remote-control unit with touchscreen user interface elements in accordance with an illustrative embodiment. In the depicted example, RCU 250 is a touchscreen device having a touchscreen interface 400, rocker switch 451, microphone 452, camera device 453, and speaker 454. Information can be presented to the user via the screen of the touchscreen interface 400 and the speaker 454. In some embodiments, the touchscreen interface 400 is used to present software controls that are configured for operation of the RCU 250. Software controls can mimic physical controls, such as buttons, dials, switches, etc. For example, software controls can include buttons, radio buttons, drop-down boxes, sliders, etc. Furthermore, the touchscreen interface 400 can also receive touchscreen gestures, such as swipe left, swipe right, swipe up, swipe down, pinch-to-zoom, two-finger rotate, etc.

Rocker switch 451 is configured to rock up or down on the side of RCU 250. Rocker switch 451 can be mapped to operations that logically have an up or down action, such as volume up, volume down, scroll up, scroll down, etc. In some embodiments, the rocker switch 451 is generally associated with up and down actions. The microphone 452 is configured to be activated for sound input or deactivated. In some embodiments, a button, such as a software button, can be selected to activate or deactivate the microphone 452. For example, a user can activate the microphone 452 to enter speech commands. In some embodiments, the microphone 452 is associated with actions for which there are predetermined speech commands.

The camera 453 is configured to receive video input. In one embodiment, the camera 453 is used to receive video of the user's face for facial recognition, lip reading, etc. In another example embodiment, the camera 453 can be used to recognize movement of the RCU 250. For example, one or more machine learning models can be trained to recognize different motion gestures, such as flick left, flick right, wave, etc.

In an embodiment, RCU 260 is a device having a specialized form factor for interaction in a particular environment. FIG. 5 is a diagram illustrating components of a remote-control unit 260 having a specialized form factor in accordance with an illustrative embodiment. In one example embodiment, RCU 260 has a substantially spherical shape with an interior housing 510, which contains processor, communication devices, input sensors, and output devices, and a soft outer material 501, such as a foam material. In some embodiments, interior housing 510 contains motion sensors 511, wireless transceiver 512, microphone 513, haptic feedback devices 514, camera 515, display 516, and speaker 517. The interior housing 510 can contain more or fewer components depending on the implementation, and some components shown inside the interior housing can be positioned outside the interior housing, and vice versa. In this example, RCU 260 can function as a ball that can be thrown, bounced, rolled, or squeezed. In some example embodiments, RCU 260 is used in a classroom environment such that the RCU 260 can be thrown or rolled from a teacher to a student or between students. The various sensors, such as the motion sensors 511, microphone 513, or camera 515, serve as input devices and collect user input. The user interface elements in this case could correspond to the RCU 260 as a whole or specified portions of the RCU. For example, a user action can be rotating the RCU 260 180 degrees, and another user action can be squeezing the bottom of the RCU 260 with a left hand.

In one embodiment, the components of the RCU 260, particularly the components within the interior housing 510, are welded or otherwise fastened and protected using known techniques to stay intact during motion. In the example of a classroom, it is advantageous to provide an RCU 260 that can withstand exaggerated user interactions, especially in embodiments where the RCU 260 is used to play games involving throwing or bouncing.

The motion sensors 511 include sensors that detect movement of the RCU 260. In one example embodiment, the motion sensors 511 include accelerometers that detect movement in lateral, longitudinal, vertical, or other directions and gyroscope devices that detect rotation about lateral, longitudinal, vertical, or other axes. Thus, in an example, the motion sensors 511 include three accelerometers and three gyroscope devices to detect movement and rotation in three orthogonal dimensions. In some embodiments, the RCU 260 can be calibrated with respect to a reference location such that the motion sensors 511 can track a location of the RCU 260 within the physical room, such as a classroom. In other embodiments, the motion sensors 511 can be used to detect a series of changing positions of the RCU 260 over time, which can be associated with motion gestures. For example, the series of changing positions can include a higher position for two seconds followed by a lower position for three seconds. Examples of motion gestures include flick right/left/up/down, wave, circle, checkmark, etc. In some embodiments, the motion sensors 511 are associated with actions for which there are predetermined motion gestures. The RCU 260 can also use motion sensors 511 to detect when the RCU 260 is being bounced, thrown, or rolled. In addition, the RCU 260 can use motion sensors 511 to track movement of the RCU 260 and, thus, to detect a location of the RCU 260.

In one embodiment, the RCU 260 includes pressure sensors 505, which detect pressure caused by squeezing or bouncing the RCU 260 in terms of amount, position, direction, duration, or other attributes. For example, a student can squeeze the RCU 260 for two seconds to activate microphone 513 and enable speech input. As another example, the teacher can hold the RCU 260 over the head and squeeze the RCU 260 to mute the volume on IODs 210, 220, 230 via wireless transceiver 512 to get the attention of students. Furthermore, the RCU 260 can use pressure sensors 505 to detect when and how the RCU is bounced, which can be interpreted as a user input element.

In one example embodiment, the RCU 260 has a transparent portion of the surface, which can be substantially flat or curved, such that a user can see the display 516 inside the RCU 260 and such that the camera 515 within the internal housing can capture video input. The RCU 260 can be designed to have a center of gravity that is farther from the flat surface than the center of the volume of the RCU, to help ensure that the curved end is on the bottom for holding while the flat side is on the top for viewing while suffering less friction. In an embodiment, video input received by camera 515 can be used to augment motion sensors 511 for location determination and for motion gesture detection. In addition, the camera 515 can receive video input of a user's face for facial recognition for identifying the user of the device.

The RCU 260 can present information to users via the display 516 or by haptic feedback devices 514. Haptic feedback, sometimes referred to as "force feedback," includes technology that provides feedback to the user by touch. Examples of haptic feedback devices 514 include vibration devices and rumble devices. Audio feedback can also be provided to the user via speaker 517. In one embodiment, the RCU 260 can use speaker 517 to amplify speech input provided to microphone 513.

The RCU 260 uses wireless transceiver 512 to receive information from and to send commands or requests to IODs 210, 220, 230 via their respective dongles. In some embodiments, the RCU 260 uses wireless transceiver 512 for detecting a location of the RCU 260 by triangulating signals received from multiple devices in the environment. For example, the RCU 260 can measure a strength of signals received from dongles 211, 221, 231 and/or from other devices that transmit wireless signals.

In other embodiments, the specialized form factor of an RCU can take different shapes or compositions. For example, an RCU can take the form of a cube, pyramid, rod, etc. As another example, an RCU can take the form of a toy, such as a stuffed bear, action figure, scale model car or airplane, etc. Other form factors will become apparent in different implementations and different environments. For instance, in a teaching environment in which life-saving techniques are being taught, an RCU can take a humanoid form.

The RCUs 240, 250, 260 are configured or programmed to send commands to the IODs 210, 220, 230 in response to user interaction with user interface elements of the RCUs 240, 250, 260. In one embodiment, the commands are encoded as standard keyboard scan codes, such as character codes, number codes, cursor movement codes, space and enter codes, etc. Alternatively, the RCUs 240, 250, 260 are configured or programmed to send more complex commands, such as coordinates on a touchscreen input area, custom requests or commands, for example.

4. EXAMPLE COMPUTING COMPONENTS

Figure 6:
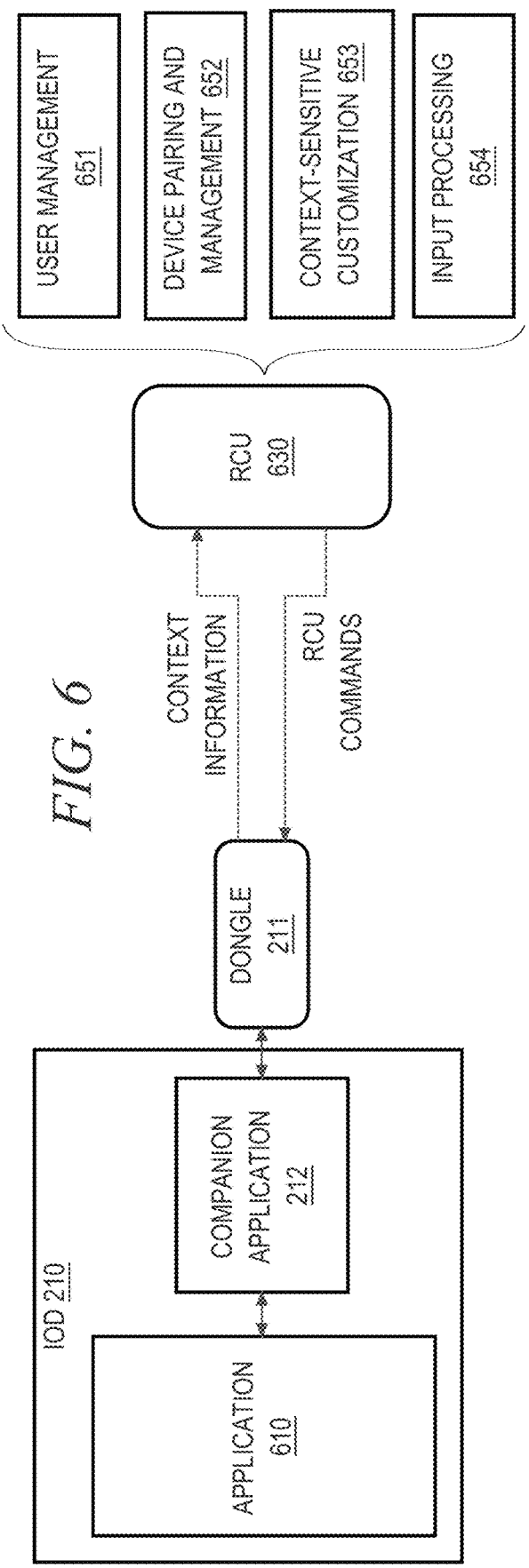
FIG. 6 is a diagram illustrating example functional components of a system for context-sensitive customization of a remote-control unit in accordance with an illustrative embodiment.

FIG. 6 is a diagram illustrating example functional components of a system for context-sensitive customization of a remote-control unit (RCU) in accordance with an illustrative embodiment. FIG. 6 is an expanded diagram of components within content presentation environment 200 shown in FIG. 2. In an embodiment, application 610 and companion application 212 execute on IOD 210. The IOD 210 is coupled to dongle 211 as described above. The dongle 211 is paired with one or more RCUs, such as RCU 630, which can be any one of RCUs 240, 250, 260 in FIG. 2, for example. RCU 630 includes user management service 651, device pairing and management service 652, context-sensitive customization service 653, and input processing service 654.

In some embodiments, the application 610 is one of a plurality of applications installed on the IOD 210 to present content and perform other tasks in the physical space. In one example embodiment, the application 610 executes within a platform, such as a web-based suite of office tools. Thus, the application 610 can be an application that is installed directly on the IOD 210, an application that executes within an application platform, or an application that executes as a service that is hosted by a server.

The user management service 651 enables a user to log in using a user profile and customizes the user interface elements of the RCU 630 according to the user profile. In some embodiments, the user management service 651 authenticates the user by prompting the user to enter a password or personal identification number (PIN). In other embodiments, the user management service 651 can authenticate the user by performing facial recognition or voice recognition or by using biometric sensors, such as a fingerprint sensor, for example. User profiles can be associated with certain authorized actions. For example, a teacher or administrator can perform actions that students are not authorized to perform.

Device pairing and management service 652 provides functions that allow the user to pair the RCU 630 to different IODs, to unpair the RCU from IODs, and to switch control between the IODs that are paired to RCU 630. Pairing the RCU 630 to an IOD 210 establishes a connection between the RCU and the IOD such that information is passed for customizing the RCU 630 and for controlling the IOD. For example, the IOD 210 can send context information to the RCU 630 that specifies the applications installed on the IOD 210 and capabilities of the applications. The user can then select which IOD to control based on these capabilities.

Context-sensitive customization service 653 customizes the user interface of the RCU 630 based on a context of content being presented on the IOD 210 being controlled by the RCU. In an illustrative embodiment, IOD 210 runs an active application to present content to an audience, such as a classroom of students. While the IOD 210 can run multiple applications, one application 610 is activate (i.e., has "focus") at a given time. Companion application 212 collects context information for the IOD 210. The context information can include an identification of all applications installed or running on IOD 210, active application, an active object (e.g., a file) being presented by the active application, and a position within the active object (e.g., a current slide, a current page, a position within a video, a position within a sound file, etc.). In one example embodiment, the active application presents a multi-media object, such as a document, slide, or web page, with embedded objects of different forms (e.g., video and audio). In this case, the context information can include an identification of the embedded objects and an indication of which embedded object is active or has focus.

In some embodiments, dongle 211 is configured to send the collected context information to RCU 630 via wireless communication. In one embodiment, companion application 212 issues commands to the dongle 211 to send the collected context information to the RCU 630 in response to a change in the context information. In another embodiment, the dongle 211 is configured to periodically poll the companion application 212 for collected context information. In an embodiment, the dongle 211 monitors which application is running and which object is active in the application. The dongle 211 can monitor the active application and the active object by querying an operating system being run on the integrated output device, making a call to an API of the active application, communicating with a device driver on the integrated output device, communicating with a plugin or extension configured on the active application, or communicating with a separate companion application running on the integrated output device. In yet another embodiment, the RCU 630 is programmed to periodically poll the dongle 211 for context information, and the companion application 212 collects the context information in response to polling from the RCU 630.

In some embodiments, given a current page and a current object within the page, the RCU can determine both commands that are applicable to the page level and commands that are applicable to the object level. For example, for a webpage, one command is to navigate to the next page at the "page" level (as in a search result split into multiple pages) and another command is to highlight the first paragraph at the object level. In another embodiment, the RCU can include actions to navigate between embedded objects, as well as actions to navigate up and down levels of the content hierarchy.

In some embodiments, the context information can be transmitted as a data structure that conveys the context information at different granularities. As an example, the context information can be structured as extensible markup language (XML), which can convey hierarchical information; however, other data structures can be used depending on the implementation. In one embodiment, the context information can take the following form: [(list of running applications), active application, active file, position within the active file]. In another embodiment, the active file information can include a hierarchical data structure if the active file has embedded objects, and the position information can include an indicator of the level of hierarchy of an object within the embedded objects that has focus. For example, if a web page includes a plurality of tabs and one particular tab has an embedded video and an embedded audio, then the context information can include the web page on a first level, the tabs at a second level, and a level beneath the particular tab at a third level containing the embedded video and the embedded audio. As another example, the context information can take the following form: [(list of installed applications), (list of running applications), (list including the active file for each application in the list of running applications including current position), indicator of the active application]. The above examples are for illustrative purposes only, and other formats and data structures can be used within the spirit and scope of the illustrative embodiments.

The context-sensitive customization service 653 determines a set of actions that can be performed on the active object within the active application. In some embodiments, the list of installed applications can include actions that can be performed by each application. This information can be collected using API calls, for example. Thus, each application in the list of applications can be expressed as a tuple, such as (application, (list of actions)). In other embodiments, the actions that can be performed by each application will be known ahead of time. Alternatively, the actions that can be performed can be determined based on content type. For example, if an application is operating on an active file with a file extension that indicates the file is a video, then the context-sensitive customization service 653 can be configured to associate the active file with actions for controlling the playing of a video.

The context-sensitive customization service 653 also manages a set of user interface elements of the RCU 630. In some embodiments, the user interface elements include physical control elements, such as buttons, scroll wheels, rocker switches, etc. For example, the user interface elements can include up, down, left, right, center buttons, which can be mapped to different actions depending on the context information. In some embodiments, the user interface elements include motion sensing elements, such as accelerometer/gyroscope sensors or a camera sensor, which detect when the RCU 630 is being shaken, pointed, waved, thrusted, turned, etc. In an embodiment, the RCU 630 has three accelerometers for measuring movement of the RCU 630 along three axes (e.g., lateral (x), longitudinal (y), and vertical (z)) and three angular rate sensors (e.g., gyroscopes)

for measuring rotation of the RCU 630 around the three axes. In another embodiment, the RCU 630 is programmed to identify movement gestures based on camera input. For instance, a machine learning model can be trained to recognize movement gestures (e.g., shaking, pointing, thrusting, waving, turning, etc.) based on the camera input.

In some embodiments, the context-sensitive customization service 653 is programmed to map actions to user interface elements based on usage history. For example, the context-sensitive customization service 653 can be programmed to record a usage history including which actions a user or group of users performs and determines the most recent and most frequent actions. Similarly, the context-sensitive customization service 653 can be programmed to record which user interface elements a user or group of users interact and determines the most recently and most frequently selected user interface elements. The context-sensitive customization service 653 can then be programmed to map the actions to the user interface elements based on the usage history. For example, the most frequently performed actions can be assigned to the user interface elements that are most frequently selected. As another example, the most recently performed actions can be given higher or lower priority. Thus, the most frequently performed action may be assigned to a button that is positioned at a natural position of the user's thumb, for example. In some cases, the most recently performed action may be likely to be performed again; however, in other cases, the most recently performed action may be less likely to be performed again within a particular time period. As a specific example, if the most recently performed action is a mute action, then it is highly likely that an unmute action will be performed. In some embodiments, the usage history can be recorded for each individual user or for groups of users or a combination of both. For example, the context-sensitive customization service 653 can consider the usage history for all teachers and also the usage history for an individual teacher.

The input processing service 654 receives user input and determines user interface elements that have been selected or manipulated by the user. The input processing service 654 interprets the user inputs and sends RCU commands or requests to dongle 211. In one embodiment, the commands are encoded as standard keyboard scan codes, such as character codes, number codes, cursor movement codes, space and enter codes, etc. In another embodiment, the commands are conventional remote codes for controlling media devices, such as cable boxes, digital video disk (DVD) players, etc. Alternatively, the input processing service 654 generates more complex commands, such as coordinates on a touchscreen input area, custom requests or commands, for example. For example, complex commands can be any commands that can be received and understood by the dongle and applications running on the IOD. For instance, there may be commands that are derived from the application's API specification.

In an embodiment, an RCU can be configured to send a command, automatically or in response to a user input, to start an application or switch to an application that is appropriate to perform a given action. For example, if an action involves playing a sound file, then the RCU can be configured to send a command to an IOD to execute an audio player application or switch to an audio player application that is running in the background. In another embodiment, the RCU can be configured to switch to another paired IOD. Thus, in the example of an action that involves playing a sound file, the RCU can be configured to switch to an IOD with audio only capabilities.

5. FUNCTIONAL DESCRIPTIONS

5.1. User Management

Returning to FIG. 4, an example user interface of remote-control unit 250 for managing multiple device pairings is shown. In the depicted example, RCU 250 is a touchscreen device. The user interface of RCU 250 includes a user profile portion 410, a fixed interface portion 420, a paired device management portion 430, and a user favorites portion 440. The user profile portion 410 presents user interface elements that allow a user to log into a user account to control the RCU. In some embodiments, other user interface portions can be customized based on which functions or operations are authorized for different users. For example, a teacher can be authorized to perform different functions than a student. In the example shown in FIG. 4, a user "Martha" is logged in. Thus, the user customization engine customizes the user interface panels of RCU 250 based on the user profile such that the user interface presents user interface elements for functions that are authorized for the user.

In an embodiment, a user account or profile stores information about a user, such as an identifier of the user, a role of the user, and permissions associated with using each RCU or each I/O device. In an example embodiment, a user account stores usage history or preference information associated with the user, such as most frequently or most recently performed actions, most frequently or most recently selected user interface elements, favorite I/O devices to use, favorite applications for particular actions, etc. In one embodiment, the RCU is configured to track and store the usage information in a usage history data structure. The RCU can also be configured to synch information from the user account with a dongle, an IOD, or a server.

The fixed interface portion 420 includes fixed user interface elements for functions that are consistent throughout operation within the content presentation environment. In the example depicted in FIG. 4, the fixed interface portion 420 includes a home button, a speech input button, and a configuration options button. As described above, user interface elements included in fixed interface portion can be selected based on the user that logged in via user profile portion 410. In one embodiment, RCU 250 is assigned a role based on the user that is logged into the RCU 250. Thus, different RCUs can be assigned different roles for an IOD based on the users logged into the RCUs. For example, an IOD can be paired with multiple RCUs including a teacher RCU and one or more student RCUs. The user interface elements presented in the user interface portions 420, 430, 440 can be customized based on the role of the RCU 250.

The user favorite interface portion 440 includes user interface elements selected by a user. In one embodiment, user favorite interface portion 440 allows the user to select favorite user interface elements, such as a chat application icon, a calendar application icon, and a share icon. The RCU 250 can be programmed to allow the user to specify which user interface elements are presented in user favorite interface portion 440. In another embodiment, the RCU 250 is programmed to identify which user interface elements are selected most recently, most often, or more frequently by the user. The RCU 250 can then present the identified user interface elements in the user favorite interface portion 440.

5.2. Device Pairing and Management

Returning to FIG. 2, the RCUs 240, 250, 260 can be paired to the IODs 210, 220, 230 in a one-to-one, one-to-many, or many-to-many arrangement. For example, RCU 240 can be paired to only IOD 210, to IOD 210 and IOD 220, or to all IODs 210, 220, 230. As another example, IOD 220 can be paired to only one RCU, such as RCU 250, to RCU 240 and RCU 250, or to all RCUs 240, 250, 260.

In some embodiments, pairing an RCU to an IOD involves a handshake protocol, between the RCU and a dongle coupled to the IOD or between the RCU and the IOD directly, in which information is exchanged between the RCU and the IOD. In an example embodiment, the RCU is programmed or configured to provide information about the RCU to the dongle or IOD, such as an identifier of the RCU (e.g., a media access control (MAC) address), an identification of a user that is logged into the RCU, etc. In one embodiment, the IOD is programmed or configured to provide, via a dongle in some embodiments, information about the IOD to the RCU, such an identifier of the IOD, a list of applications installed on the IOD, current firmware version information, etc. The RCU can use the identifier of the IOD and the list of applications installed on the IOD to determine capabilities of the IOD. For example, the IOD identifier may reveal that the IOD is an audio-only device or a smart TV device. The current firmware version may indicate whether certain features have been enabled on the IOD. The list of applications installed on the IOD may reveal actions that can be performed on the IOD. For example, an API specification of each application can reveal actions that can be performed on the application.

In some embodiments, an RCU can be configured with an automatic paring functionality. For example, each IOD, or dongle in some embodiments, can be configured or programmed to broadcast information indicating that it is available for pairing with an RCU, and the RCU can be configured or programmed to periodically scan for available IODs. In an example embodiment, the RCU can be programmed or configured to store a list of previously paired IODs, and the RCU can automatically pair to known IODs. In other embodiments, the RCU can be configured to detect when a user is performing an interaction with the RCU that indicates that the user intends to pair the RCU with a given IOD. For instance, the RCU can detect that the user is moving for the given IOD and pointing the RCU at the given IOD.

The RCU is configured to store a profile of each IOD to which it is paired and can perform actions on one or more of the paired IODs based on user interaction with the RCU. In an example embodiment, the profile of an IOD includes an identifier of the IOD and the capabilities of the IOD, for example. Furthermore, the RCU is configured to unpair from an IOD if instructed, in response to detecting that communication with the IOD fails, or in response to determining that the capabilities of the IOD are no longer needed. Responsive to unpairing from a given IOD, the RCU is configured to remove the given IOD from the list of paired devices.

With reference to FIG. 4, in one embodiment, fixed interface portion 420 includes user interface elements for selecting which user interface screen is displayed in portion 430. Thus, in the depicted example, the fixed interface portion 420 can include a "paired device management" icon. For example, a "paired device management" icon can be presented in place of the speech input icon. In response to the user selecting the "paired device management" icon, paired device management interface portion 430 is displayed. In response to the user selecting the "paired device management" icon, the "paired device management" icon can be replaced with the speech input icon, for example.

In some embodiments, the device pairing and management service presents an IOD user interface card 435 for each IOD paired to the RCU 250 in the paired device management interface portion 430. Each IOD user interface card presents an identifier of a respective IOD and a list of capabilities of the IOD. In one embodiment, the capabilities of an IOD can be determined based on the applications installed on the IOD and the actions that can be performed on the applications, such as those specified in each application's API specification, for example. The paired device management interface portion 430 allow the user to switch the IOD being controlled by the RCU 250 by switching between the IOD user interface cards 435. In one example embodiment, the paired device management interface portion 430 allows the user to switch between the IOD user interface cards by swiping left and right. In an alternative embodiment, the IOD user interface cards 435 can be presented vertically, and the user can swipe up and down. Other techniques for switching between IOD user interface cards 435 can be used in other embodiments.

In one embodiment, the use can also unpair devices within the paired device management interface portion 430. For example, a user can long-press on IOD user interface card 435 to activate a management menu (not shown) that includes an option to unpair the corresponding IOD. The management menu can also include an option to rearrange the IOD cards, for example.

In one embodiment, the device pairing and management service allows the user to rearrange IOD user interface cards 435 in device management interface portion 430 so that the IOD user interface cards 435 are physically congruent with the IODs. That is, a user can rearrange the IOD user interface cards 435 such that a IOD user interface card on the left corresponds to an IOD on the left side of the content presentation environment, an IOD user interface card in the center corresponds to an IOD in the center of the content presentation environment, and an IOD user interface card on the right corresponds to an IOD on the right side of the content presentation environment. In one embodiment, the user can enter a rearrangement mode by long-pressing within the device management interface portion 430.

In some embodiments, the device pairing and management service determines actions to assign to user interface elements based on capabilities of the selected IOD card 435. For example, the selected IOD card 435 can indicate that the IOD has a capability of opening web pages. In one embodiment, the RCU assigns actions of running a web browser application and opening a web page associated with a chat service to a particular user interface element. In response to the user selecting a particular user interface element, the RCU 250 is configured to send the action to the dongle 211.

5.3. Context-Sensitive Customization

Figure 7A:
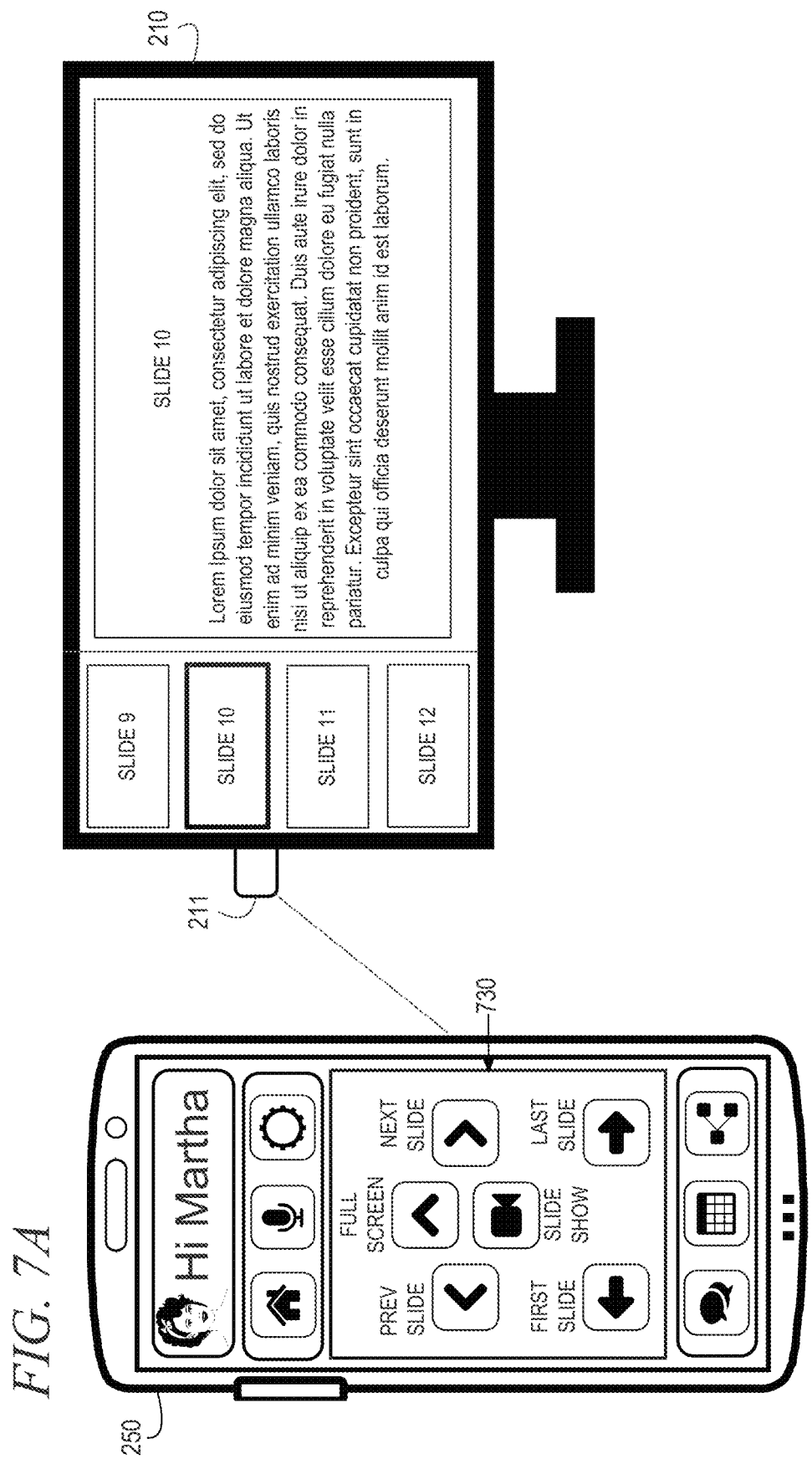
FIG. 7A illustrates an example user interface of remote-control unit with context-sensitive customizations for a presentation application in accordance with an illustrative embodiment.

In some embodiments, the RCU is a touchscreen device that is capable of presenting software user interface elements that mimic physical control elements. FIG. 7A illustrates an example user interface of remote-control unit 250 with context-sensitive customizations for a presentation application in accordance with an illustrative embodiment. The RCU 250 communicates with IOD 210 via dongle 211. The RCU 250 includes a context-sensitive user interface portion 730 that includes user interface elements for performing actions that are specific to an active application and an active object being presented by the active application. In the depicted example, the active application is a presentation application, and the active object is a presentation file including a plurality of slides. The user interface elements in the context-sensitive user interface portion 730 can include buttons for performing actions, such as previous slide, next slide, full screen, slide show, first slide, and last slide, for example.

In the example shown in FIG. 7A, the active application executing on IOD 210 is a presentation application showing a presentation object comprising a plurality of slides. In this example, slide 10 is being presented. Thus, the context information can include an active object, such as the presentation object, and an active item, such as the current slide. The context information can further include a position within the active object, such as an index of a current slide being presented. In this example, the current slide is neither the first slide nor the last slide; therefore, the context-sensitive customization service 653 maps a previous slide action, a next slide action, a first slide action, and a last slide action to user interface elements within the context-sensitive user interface portion 730. If the current slide is the first slide, then the context-sensitive user interface portion 730 would not include a previous slide action or a first slide action. Similarly, if the current slide is the last slide, then the context-sensitive user interface portion 730 would not include a next slide action or a last slide action. The actions would be mapped dynamically based on the context information received from the IOD 210.

In some embodiments, an application, such as the presentation application shown in FIG. 7A, can be in different display modes, such as full screen, windowed, or a particular zoom level. Thus, the context information can include the display mode or zoom level of the application. The RCU can be programmed to map actions that change the display mode to the user interface elements. For example, the context-sensitive user interface portion 730 shown in FIG. 7A includes a "Full Screen" user interface element mapped to an action that transitions the presentation application into a full screen display mode.

Figure 7B:
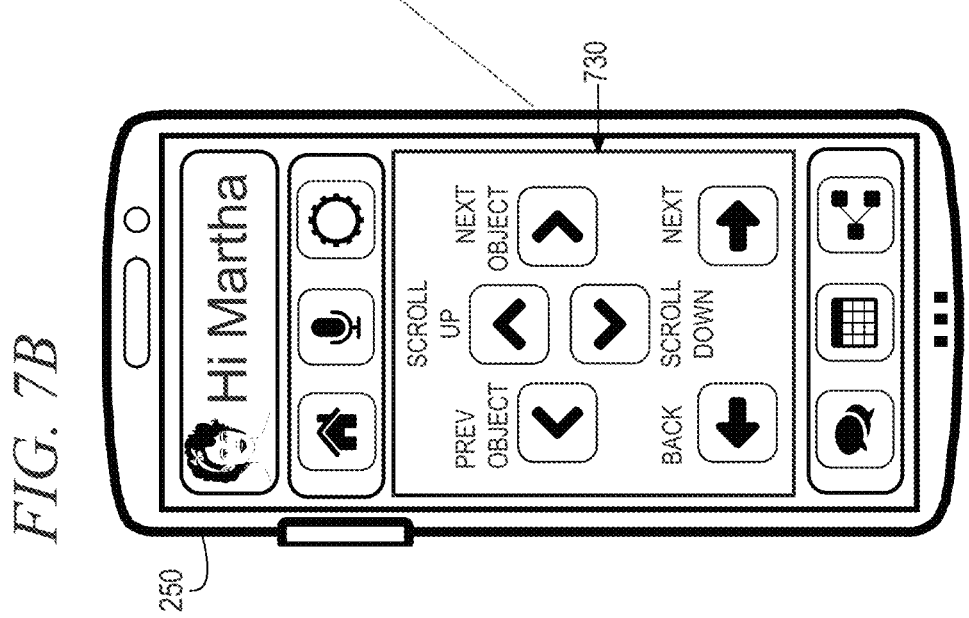
FIG. 7B illustrates an example user interface of the remote-control unit with context-sensitive customizations for presenting multi-media objects in accordance with an illustrative embodiment.

FIG. 7B illustrates an example user interface of the remote-control unit 250 with context-sensitive customizations for presenting multi-media objects in accordance with an illustrative embodiment. The RCU 250 communicates with IOD 210 via dongle 211. In the depicted example, the active application is a web browser, and the active object is a web page including a plurality of embedded objects 711, 712, 713 that are indexed in a specific order. The user interface elements in the context-sensitive user interface portion 730 can include buttons for performing actions, such as scroll up, scroll down, navigating back a page, navigating forward to a next page, etc. In addition, the user interface elements in the context-sensitive user interface portion 730 can include user interface elements mapped to actions for navigating to the embedded objects 711, 712, as illustrated in FIG. 7D.

In one example embodiment, selecting a button to navigate to an embedded object, such as the UI element that's been mapped to the "next object" action, can cause a change in context such that the active object changes. For example, if the next object is a video 711, then the RCU 250 can then obtain context information via dongle 211, and the context-sensitive customization service can map user interface elements in the context-sensitive user interface portion 730 to actions that can be performed on a video, such as play, rewind, fast forward, etc. The context-sensitive customization service can perform this customization by mapping the user interface elements to different actions or by replacing the user interface elements with new user interface elements in context-sensitive user interface portion 730.

Figure 7C:
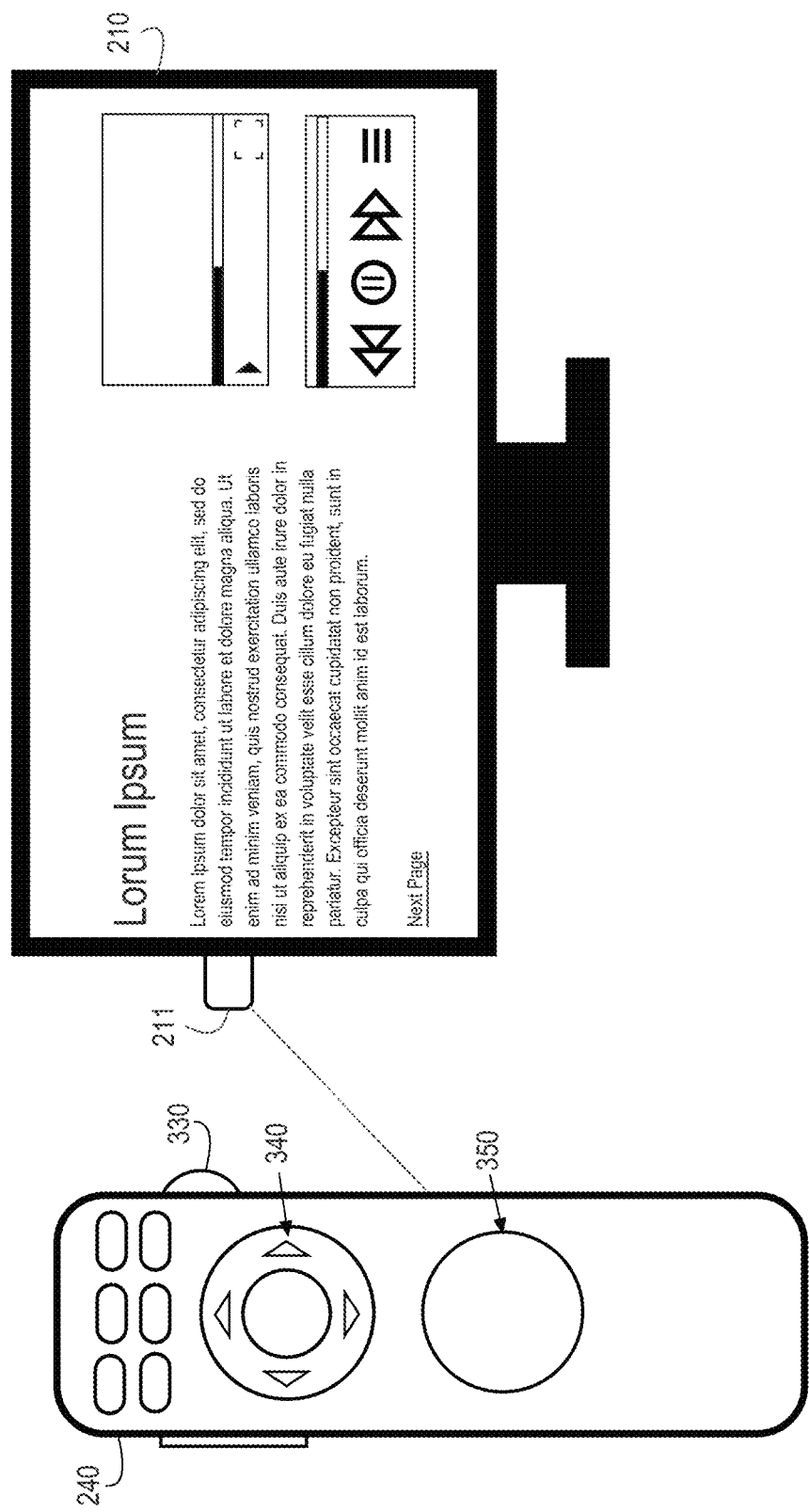
FIG. 7C illustrates example context-sensitive customizations of physical control elements for control of a web page on an integrated output device in accordance with an illustrative embodiment.
Figure 7D:
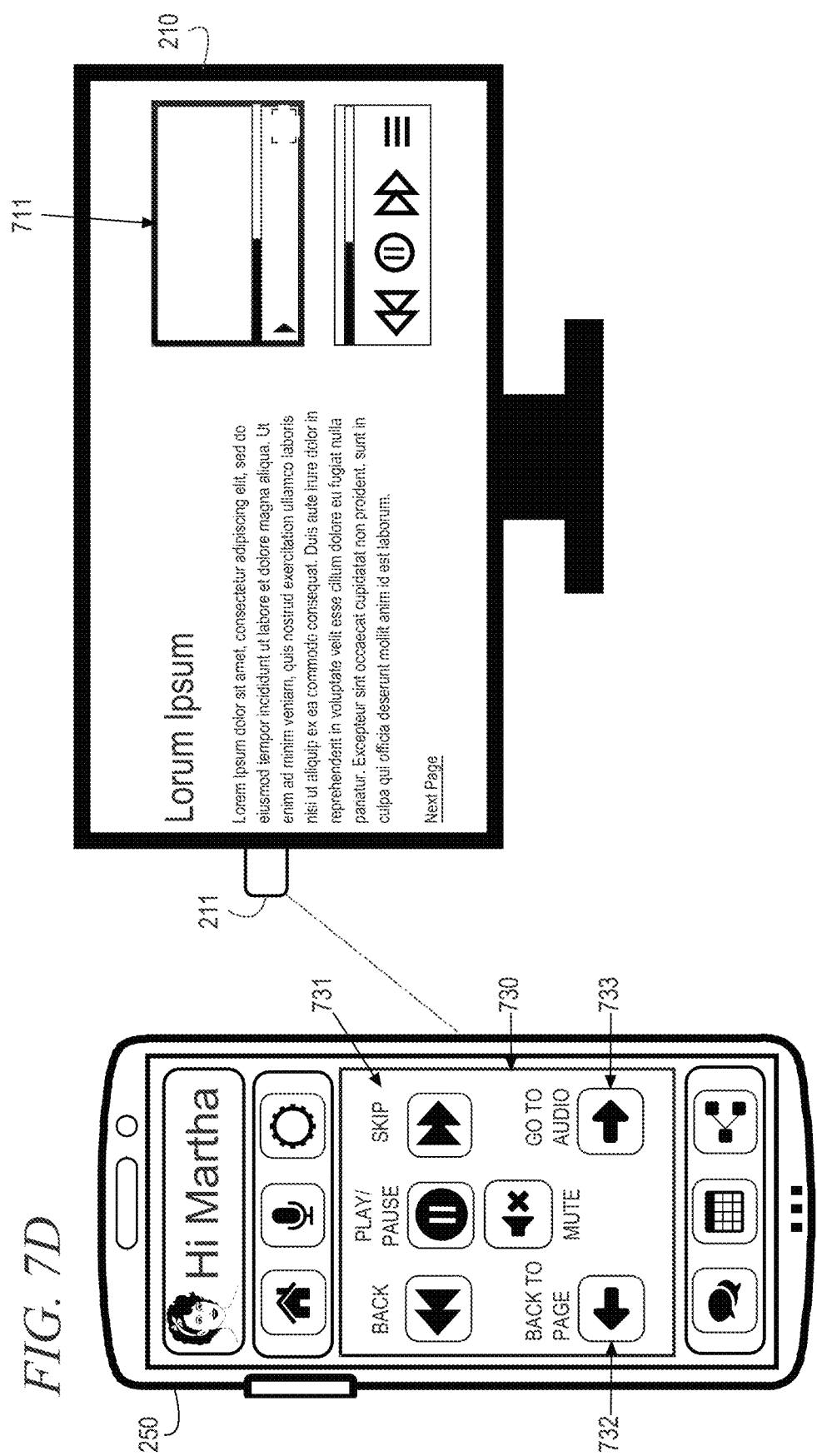
FIG. 7D illustrates an example user interface of the remote-control unit with context-sensitive customizations for a selected embedded object in accordance with an illustrative embodiment.

FIG. 7C illustrates example context-sensitive customizations of physical control elements for control of a web page on an integrated output device in accordance with an illustrative embodiment. The RCU 240 communicates with IOD 210 via dongle 211. In the depicted example, the active application is a web browser, and the active object is a video embedded within a web page including a plurality of embedded objects. The RCU 240 includes a scroll wheel 330, directional buttons 340, and a dial 350, as described above. In the depicted example, the context-sensitive customization service 653 maps the physical control elements 330, 340, 350 to actions that can be performed on the web browser and objects presented on IOD 210.

In one example embodiment, the context-sensitive customization service maps the scroll wheel 330 to scroll up and scroll down actions, maps the directional buttons 340 to actions for navigating to and selecting embedded objects within the web page, and maps the dial 350 to scroll left and scroll right actions. The context-sensitive customization service can perform other mappings based on the context information or the usage histories.

FIG. 7D illustrates an example user interface of the remote-control unit 250 with context-sensitive customizations for a selected embedded object in accordance with an illustrative embodiment. The RCU 250 communicates with IOD 210 via dongle 211. In the depicted example, the active application is a web browser, and the active object is a video embedded within the web page. The user interface elements in the context-sensitive user interface portion 730 can include buttons for performing actions, such as skip back, skip forward, play/pause, etc. In addition, the user interface elements in the context-sensitive user interface portion 730 can include a user interface element 732 mapped to an action of navigating up to the web page and a user interface element 733 mapped to an action of navigating to a next embedded object, such as the audio object.

Figure 7E:
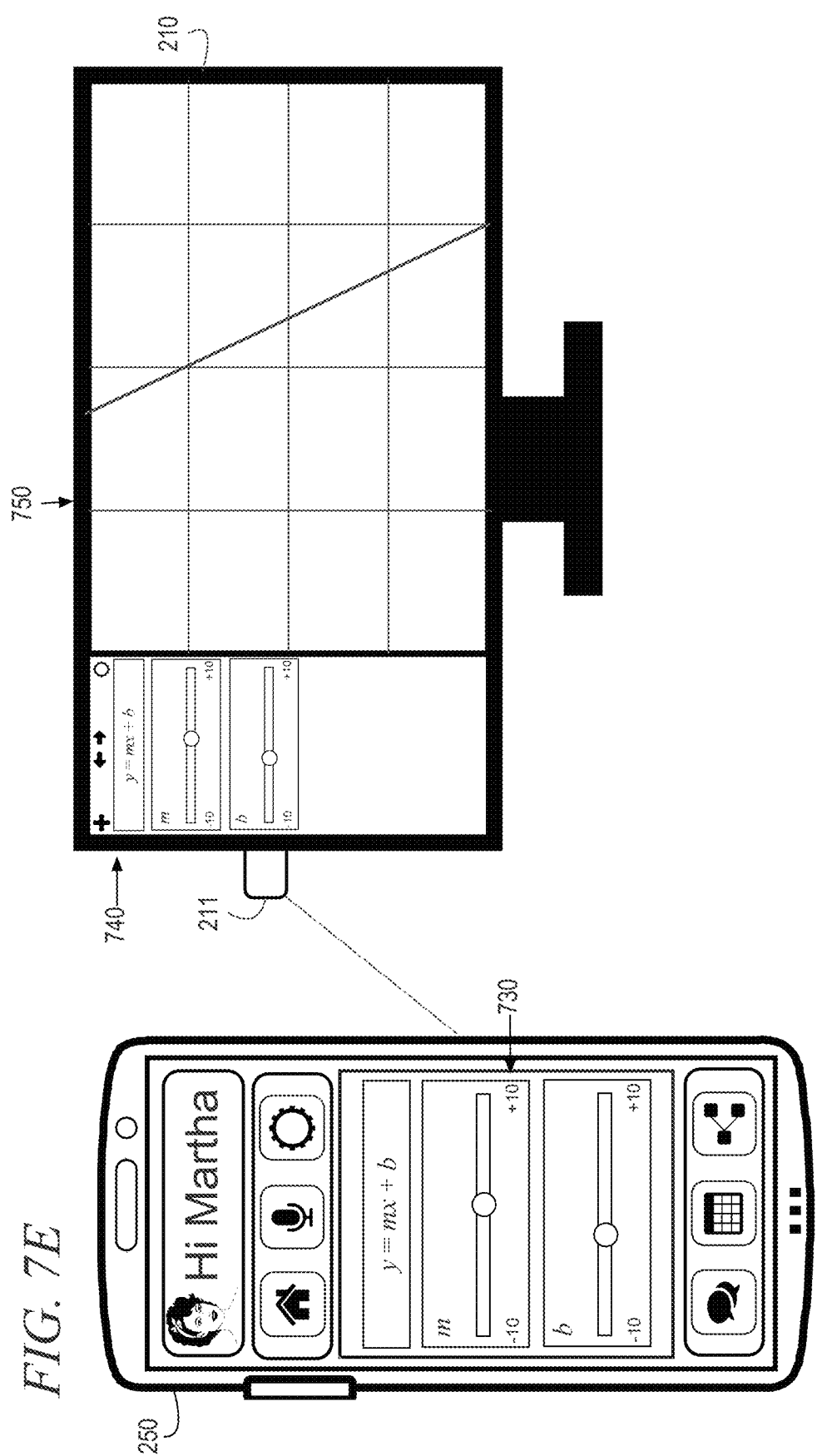
FIG. 7E illustrates an example user interface of the remote-control unit with context-sensitive customizations for a graphing calculator application in accordance with an illustrative embodiment.

FIG. 7E illustrates an example user interface of remote-control unit 250 with context-sensitive customizations for a graphing calculator application in accordance with an illustrative embodiment. The RCU 250 communicates with IOD 210 via dongle 211. In the depicted example, the active application is a graphing calculator application that includes user interface elements for entering an equation including variables and constants and controls for adjusting the constant values. The context-sensitive customization service creates user interface elements in the context-sensitive user interface portion 730 corresponding to the control elements and maps the actions associated with the control elements to the user interface elements.

In the example shown in FIG. 7E, the equation being graphed is "$y=mx+b$," where x and y are variables corresponding to axes in the graph, and m and b are constants. The graphing calculator application has a user input portion 740 and a display portion 750. In this example, a companion application executing on IOD 210 identifies user interface elements in the user interface portion 740 and includes the identifications of the user interface elements in the context information. The dongle 211 then sends this context information to the RCU 250. The user interface elements in the user interface portion 740 include constant adjustment elements for decreasing and increasing a first constant m and constant adjustment elements for decreasing and increasing a second constant b. In one embodiment, the user interface elements include slider controls for adjusting the constants.

In response to the RCU 250 receiving the context information, the context-sensitive customization service generates user interface elements within the context-sensitive user interface portion 730 of the RCU 250 and maps actions corresponding to these user interface elements. Thus, in the example depicted in FIG. 7E, the user interface elements in user interface portion 730 correspond to the user interface elements in user interface portion 740. The RCU is programmed or configured to determine a set of actions that can be performed and mapped to user interface elements. This can be accomplished by the dongle collecting information about the user interface elements in user interface portion 740 and their corresponding actions. For example, the graphing calculator application can be instrumented with a plugin or extension that communicates this information to the dongle. As another example, this information may be derived from an API specification of the graphing calculator application. With this information, the RCU can generate the sliders shown in the context-sensitive user interface portion 730, which corresponding to similar user interface elements in the user interface portion 740.

In response to the user interacting with the context-sensitive user interface portion 730, the input processing service generates commands or requests for performing actions on the graphing calculator application, which are shown in the display portion 750 of the graphing calculator application.

In some embodiments, the application executing on the IOD can present content having layers. For instance, the IOD 210 can present multiple graphs for different equations. Another example is a map application that presents a map with layers representing points of interest, elevations, resource layers, weather information, etc. A map application may also present different views, such as road view and satellite view. These different layers or views occupy the same locations on the display or screen. The layers can be turned on or off or can be moved up or down or given different priorities. In an example embodiment, the RCU can be programmed to generate user interface elements within the context-sensitive user interface portion 730 for navigating between layers, turning on or off layers, or rearranging layers being presented by an application on the IOD 210.

In some embodiments, the application executing on the IOD can present content having different displayed content depending on a zoom level or an area covered by the displayed content. For instance, the IOD can present a mapping application in which various points of interest are shown on a map. In response to the zoom level changing in the mapping application, the points of interest covered by the displayed area will change. Similarly, the points of interest that are covered will change in response to a user moving the map left, right, up, or down. The points of interest that are available for selection will change depending on the zoom level of other changes to the area covered by the mapping application. Thus, information such as the points of interest covered by the area presented in a mapping application can be included in the context information, and the RCU can present controls for selection of these points of interest, as well as controls for changing the zoom level or shifting the displayed area.

Figure 7G:
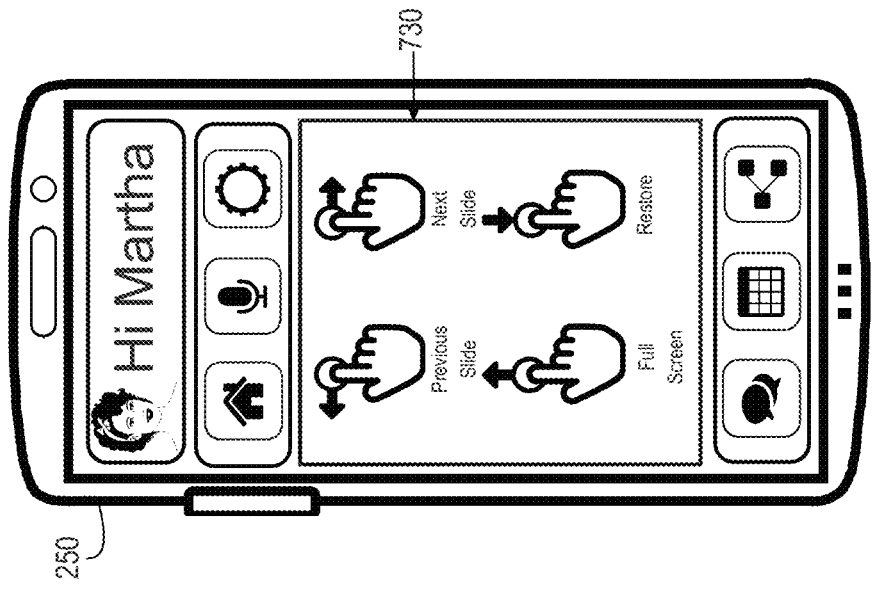
FIG. 7G illustrates an example user interface of the remote-control unit with context-sensitive customizations of touchscreen gestures for a slideshow presentation in accordance with an illustrative embodiment.
Figure 7F:
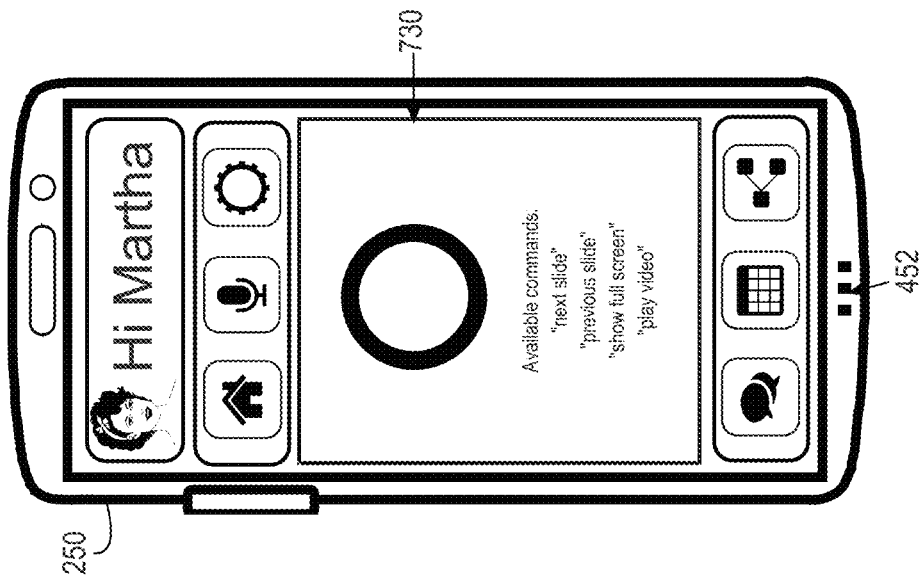
FIG. 7F illustrates an example user interface of the remote-control unit with context-sensitive customizations of speech commands for a slideshow presentation in accordance with an illustrative embodiment.

FIG. 7F illustrates an example user interface of remote-control unit 250 with context-sensitive customizations of speech commands for a slideshow presentation in accordance with an illustrative embodiment. In the depicted example, the RCU 250 includes a microphone 452, and the context-sensitive user interface portion 730 includes a speech input button. The context-sensitive customization service maps actions that are specific to slideshow presentations to the speech commands. The context-sensitive customization service presents the mapping of the actions to the speech commands as suggestions for voice or speech input in the context-sensitive user interface portion 730. In response to a change in context, the context-sensitive customization service maps actions for the new context to speech commands.

In some embodiments, the speech commands can be predetermined utterances (e.g., "go," "back," "yes," "no," "up," "down," "left," "right," etc.) spoken at predetermined volumes. In other embodiments, the speech commands can be generated based on the actions that can be performed on the active application and/or the active content. For example, context information received by the RCU from the dongle can include actions derived from an API specification of the active application on the IOD. In an embodiment, these actions may be expressed in a manner that easily lends itself to mapping to voice commands. For example, the actions can include method calls that have an English word in the name, such as "open" or "close." The RCU can be programmed to generate speech commands that correspond to the names of methods, commands, requests, etc.

FIG. 7G illustrates an example user interface of the remote-control unit 250 with context-sensitive customizations of touchscreen gestures for a slideshow presentation in accordance with an illustrative embodiment. In the depicted example, the context-sensitive user interface portion 730 receives touchscreen gestures. The context-sensitive customization service maps actions that are specific to slideshow presentations to touchscreen gestures. The context-sensitive customization service presents the mapping of the actions to the gestures in the context-sensitive user interface portion 730. In response to a change in context, the context-sensitive customization service maps the gestures to different actions. For instance, if the active object is a presentation slide, then the swipe left gesture can be mapped to a next slide action. If the user swipes left and the next slide includes an embedded video object, then the swipe right gesture can be remapped to a fast forward action. Touchscreen gestures can include single finger gestures (e.g., swipe right, swipe left, swipe up, swipe down, etc.), multiple finger gestures (e.g., pinch in, pinch out, rotate, pan, etc.), or whole hand gestures.

6. EXAMPLE PROCESSES

Aspects of the illustrative embodiments are described herein with reference to flowchart illustrations. It will be understood that each block of the flowchart illustrations and combinations of blocks in the flowchart illustrations can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, implement the activities specified in the flowcharts.

The flowchart and block diagrams in the figures illustrate the architecture, functionality, and operation of possible implementations of systems, methods, and computer readable storage media according to various embodiments. In this regard, each block in the flowchart may represent a module, segment, or portion of instructions, which comprises one or more executable instructions for implementing the specified logical functions. In some alternative implementations, the functions noted in a block can occur out of the order noted in the figures. For example, two blocks shown in succession can, in fact, be executed substantially concurrently, or the blocks can sometimes be executed in the reverse order, depending upon the functionality involved.

Figure 8:
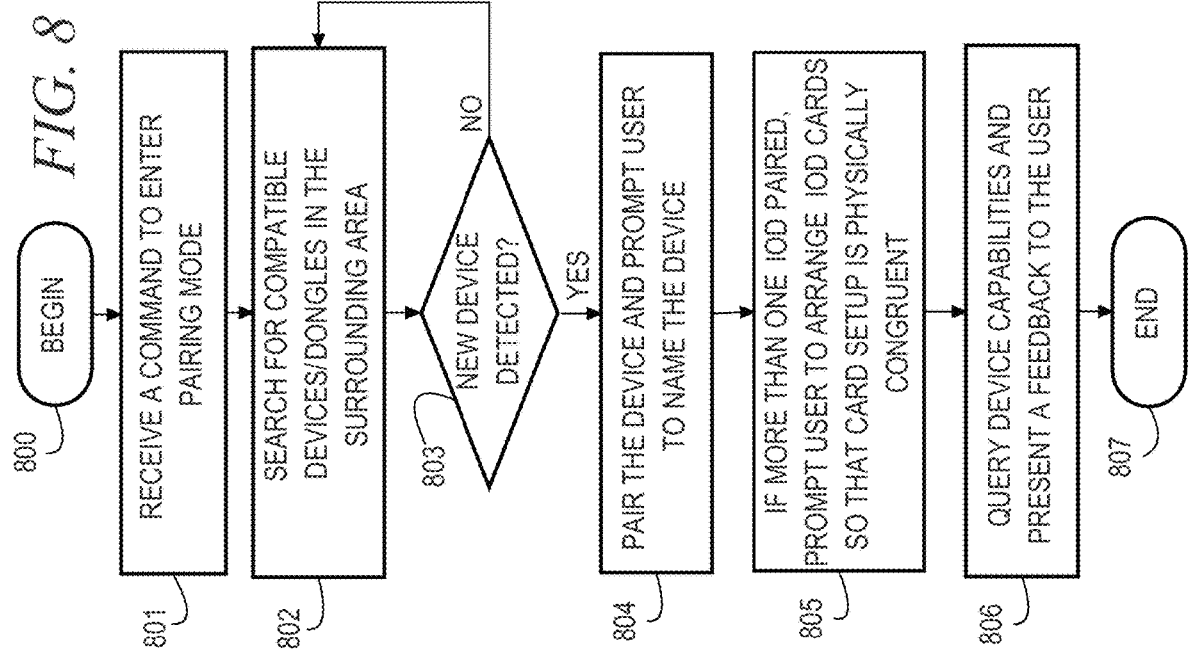
FIG. 8 is a flowchart illustrating operation of a remote-control unit for pairing with integrated output devices in accordance with an illustrative embodiment.

FIG. 8 is a flowchart illustrating operation of a remote-control unit for pairing with integrated output devices in accordance with an illustrative embodiment. Operation begins (block 800, and the remote-control unit (RCU) receives a command to enter pairing mode (block 801). The RCU is configured or programmed to search for compatible devices, such as integrated output devices (IODs) or dongles for controlling IODs, in the surrounding area (block 802). In one embodiment, the surrounding area is defined by a signal range of the wireless technology (e.g., the Bluetooth® short-range wireless technology standard) used for communicating between the RCU and the devices with which the RCU is being paired. The RCU is configured to determine whether a new device is detected (block 803). If a new device is not detected (block 803: NO), then operation returns to block 802 to search for compatible devices until a new device is detected.

If a new device is detected (block 803: YES), then the RCU is configured to pair with the device and prompt the user to name the device (block 804). In some embodiments, the device is a dongle for controlling an IOD. The user can name the device based on its association with the IOD. For example, if the dongle is coupled to a projector display device, then the user can name the dongle being paired as "Projector Display," as shown in FIG. 4.

If more than one IOD is paired, via more than one dongle, then the RCU is configured to prompt the user to arrange IOD cards on the interface of the RCU so that the card setup is physically congruent (block 805). That is, a user can rearrange the IOD user interface cards such that a IOD user interface card on the left corresponds to an IOD on the left side of the content presentation environment, an IOD user interface card in the center corresponds to an IOD in the center of the content presentation environment, and an IOD user interface card on the right corresponds to an IOD on the right side of the content presentation environment.

The RCU is configured to query the device capabilities and present feedback to the user (block 806). The device capabilities can be collected by the dongle, such as by identifying applications installed on the IOD. The user can use the device capability feedback to select an IOD for presenting content. For instance, if the user wishes to present a video, then the user can switch to an IOD card that indicates an IOD with a capability of displaying videos. Thus, the user can switch from a smart speaker IOD card to a smart TV IOD card. Thereafter, operation ends (block 807).

Figure 9:
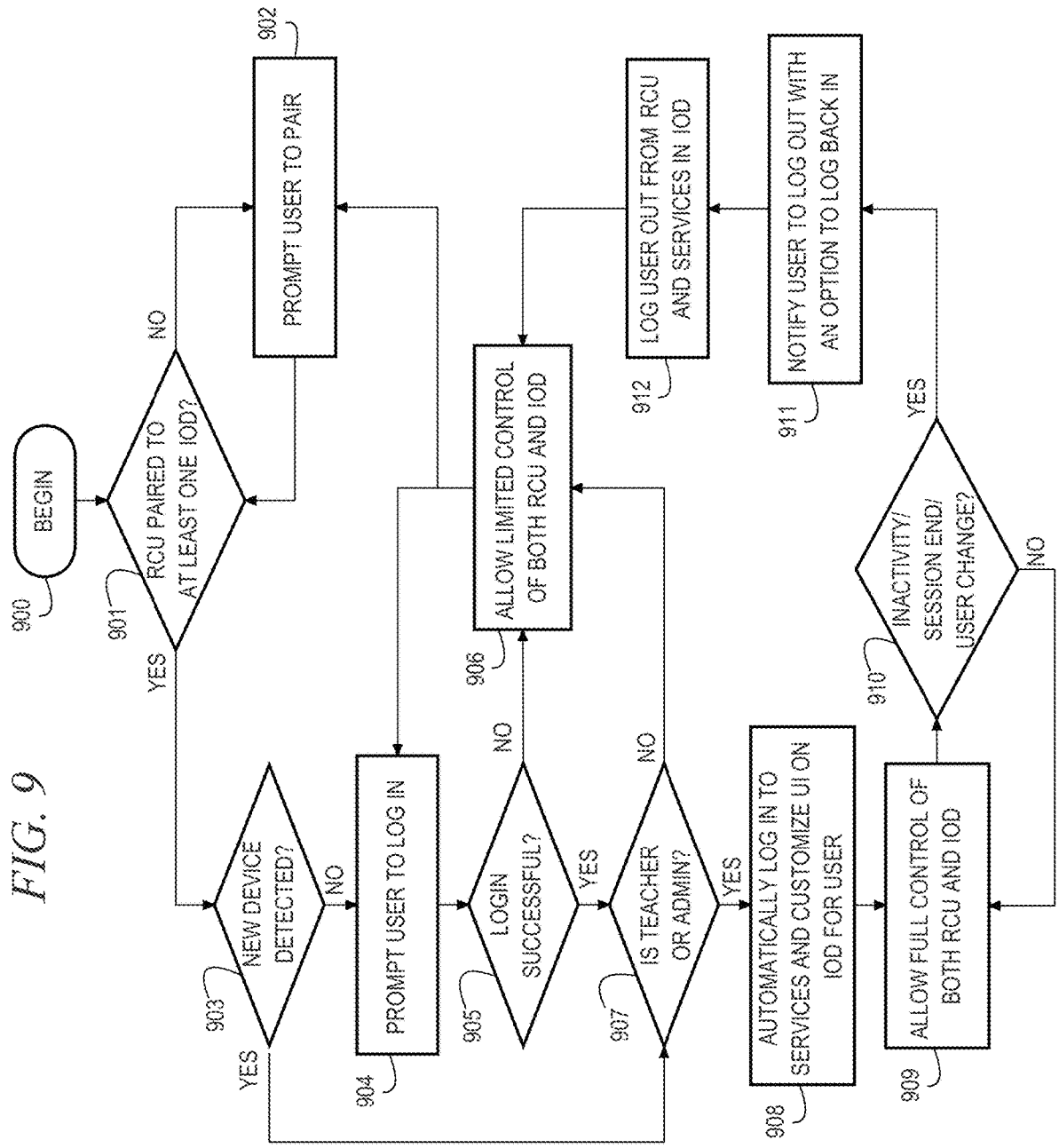
FIG. 9 is a flowchart illustrating operation of a remote-control unit for managing user control based on user role in accordance with an illustrative embodiment.

FIG. 9 is a flowchart illustrating operation of a remote-control unit for managing user control based on user role in accordance with an illustrative embodiment. Operation begins (block 900), and determination is made whether the RCU is paired to at least one IOD (block 901). If the RCU is not paired to at least one IOD (block 901: NO), then the RCU is configured to prompt the user to pair with an IOD (block 902), and operation returns to block 801 until the RCU is paired to at least one IOD.

If the RCU is paired to at least one IOD (block 901: YES), then a determination is made whether a user is logged in (block 903). If a user is not logged in (block 903: NO), then the RCU is configured to prompt the user to log in (block 904). A determination is made whether login of the user is successful (block 905). If login is not successful (block 905: NO), then the RCU is configured to allow limited control of both the RCU and the IOD to the user (block 906). Operation returns to block 902 to prompt the user to pair a device responsive to the user selecting a pair new device option in the RCU. Operation returns to block 904 to prompt the user to log in responsive to the user selecting a login option in the RCU.

If the user is logged in (block 903: YES) or login is successful (block 905: YES), then a determination is made whether the user is a teacher or administrator (block 907). If the user is not a teacher or administrator (block 907: NO), then operation returns to block 906 to allow limited control of both the RCU and the IOD. If the user is a teacher or administrator (block 907: YES), then the RCU is configured to automatically log in to services and customize the user interface (UI) on the IOD for the user (block 908). The RCU is configured to allow full control of both the RCU and the IOD to the user (block 909). A determination is made whether there is a period of inactivity, the session has ended, or the user logged into the RCU has changed (block 910). If there is no inactivity/session end/user change detected (block 910: NO), then operation returns to block 909 to allow full control of the RCU and IOD.

If there is inactivity/session end/user change detected (block 910: YES), then the RCU is configured to notify the user to log out with an option to log back in (block 911). The RCU is configured to log the user out from the RCU and the services on the IOD (block 912). Then, operation returns to block 906 to allow limited control of the RCU and IOD.

Figure 10:
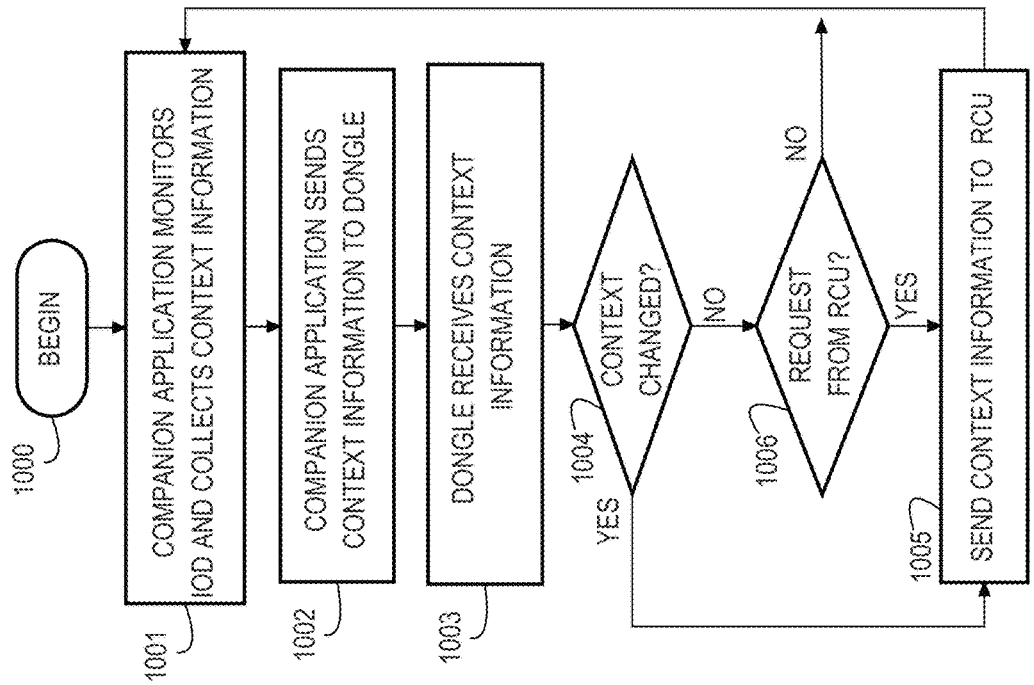
FIG. 10 is a flowchart illustrating operation of an integrated output device for communicating context information to a paired remote-control unit in accordance with an illustrative embodiment.

FIG. 10 is a flowchart illustrating operation of an integrated output device for communicating context information to a paired remote-control unit in accordance with an illustrative embodiment. Operation begins (block 1000), and the companion application monitors the IOD and collects context information including an active application, active content, and a position in the content (block 1001). In one embodiment, the companion application can query the operating system running on the IOD for the active application that has focus on the IOD. In an embodiment, the companion application calls an API of the active application to query the active content, including objects and embedded objects, and a position in the active content, such as a slide being shown, a position in a video, a position in an audio file, etc. The companion application sends the collected context information to the dongle (block 1002).

The dongle is configured to receive the context information (block 1003) and determine whether the context has changed (block 1004). The context can change when a new application becomes the active application (i.e., has focus), when the active application opens a new object, or when the current position in the content changes, for example. If the dongle detects that the context has changed (block 1004: YES), then the dongle is configured to send the context information to the RCU (block 1005). Thereafter, operation returns to block 1001, and the companion application monitors the IOD and collects context information.

If the dongle does not detect that the context has changed (block 1004: NO), then the dongle is configured to determine if a request for context information is received from a paired RCU (block 1006). If a request for context information is not received (block 1006: NO), then operation returns to block 1001, and the companion application monitors the IOD and collects context information. If a request for context information is received from a paired RCU (block 1006: YES), then the dongle is configured to send the context information to the RCU (block 1005), and operation returns to block 1001, and the companion application monitors the IOD and collects context information.

Figure 11:
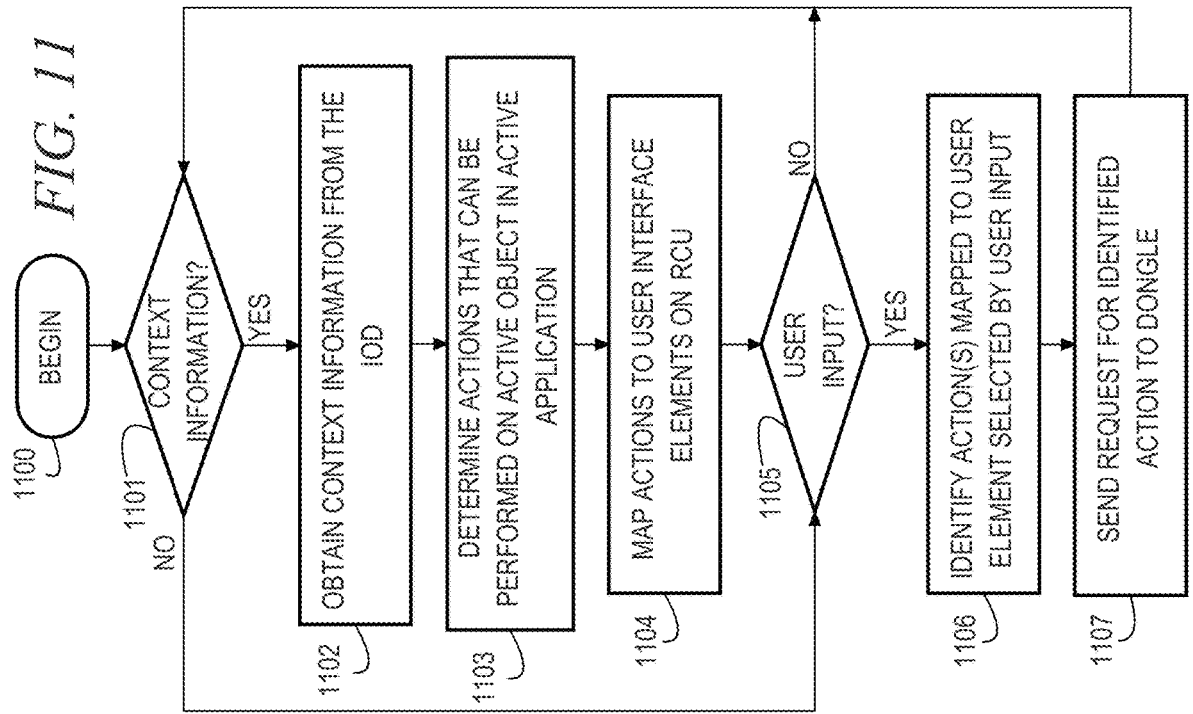
FIG. 11 is a flowchart illustrating operation of a remote-control unit for context-sensitive customization in accordance with an illustrative embodiment.

FIG. 11 is a flowchart illustrating operation of a remote-control unit for context-sensitive customization in accordance with an illustrative embodiment. Operation begins (block 1100), and the RCU is configured to determine whether context information is received from the IOD (block 1101). The context information may be received in response to a change in context information at the IOD, as detected by the dongle. Alternatively, the context information may be received in response to a polling request from the RCU.

If the RCU detects that context information is received (block 1101: YES), then the RCU is configured to obtain context information from the paired IOD (block 1102). The RCU is configured to determine actions that can be performed on active objects in the active application (block 1103). The RCU is configured to map the actions to user interface elements of the RCU based on the context information (block 1104). The user interface elements can be physical controls or software user interface elements, such as touchscreen controls, gestures, speech commands, etc.

Thereafter, or if new context information is not received (block 1101: NO), the RCU is configured to determine whether user input is received (block 1105). If user input is not received (block 1105: NO), then operation returns to block 1101 to determine whether new context information is received.

If the RCU receives user input (block 1105: YES), then the RCU is configured to identify one or more actions mapped to a user element selected by the user input (block 1106). The RCU is configured to send a request for the identified action to the dongle (block 1107). Thereafter, operation returns to block 1101 to determine whether new context information is received.

7. HARDWARE IMPLEMENTATION

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
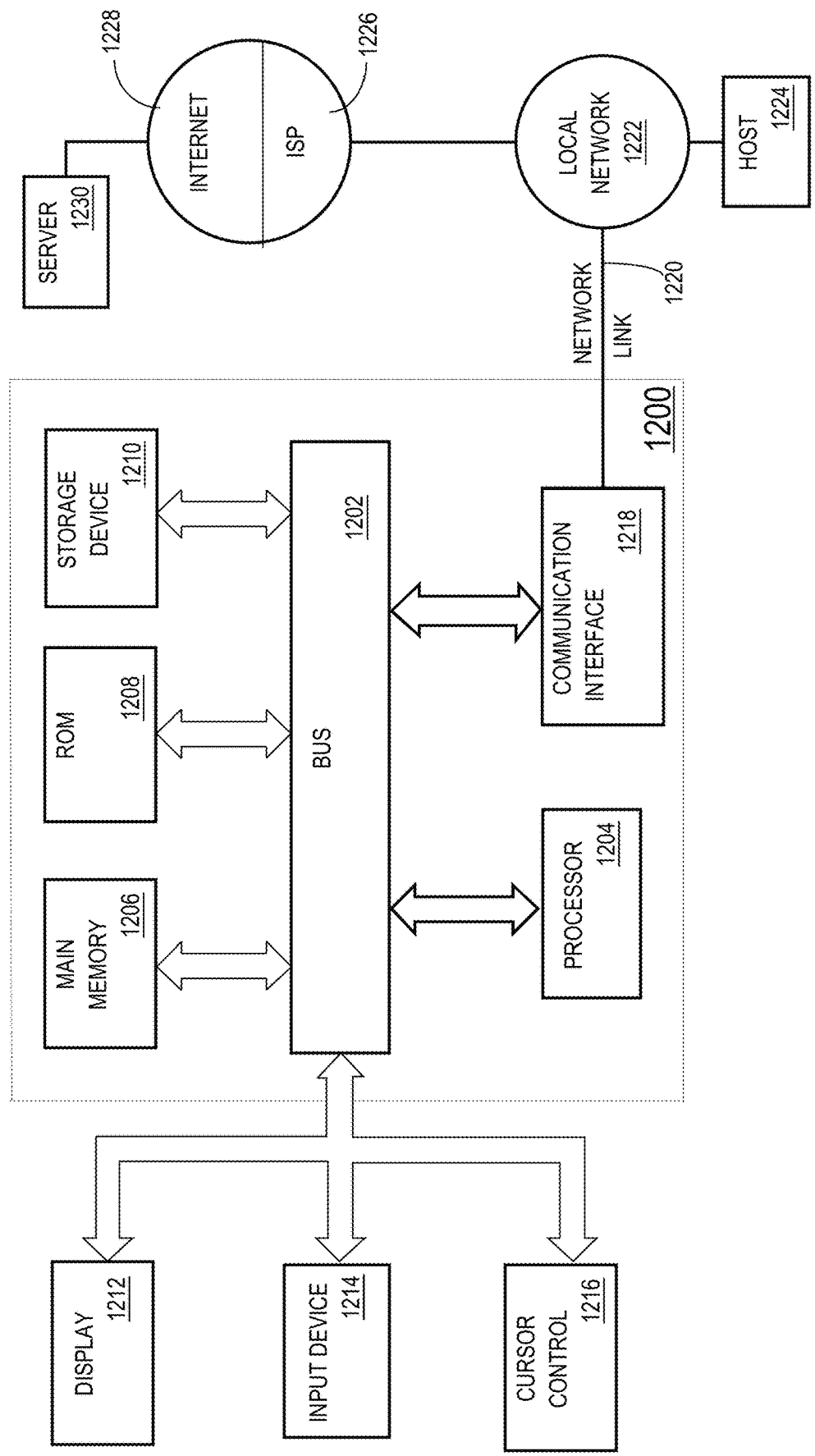
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

8. EXTENSIONS AND ALTERNATIVES

In other embodiments, the RCU is programmed to use machine learning models to predict actions that are performed by applications on objects. For example, a machine learning model can be trained based on a training data set including applications, objects that can be loaded by the applications, and actions that are performed on the objects. Using context information as input, the trained machine learning model can then predict which actions the user is likely to perform on a given object using the given application. The machine learning model can be trained for all users, each category of users (e.g., teachers, students, administrators, etc.), or individual users.

In other embodiments, the RCU is programmed to receive a user input indicating an action to be performed and selects one or more applications that can perform the action. The RCU is programmed to examine the capabilities of IODs paired to the RCU and select an IOD with a capability (i.e., an application) of performing the action. For example, in response to a user requesting to open a presentation file, the RCU is programmed to identify an IOD paired to the RCU having an application capable of opening presentation files. The RCU is programmed to switch to the identified IOD and send a request for the IOD to run the application and open the presentation file.

In some embodiments, the RCU is programmed to customize the user interface elements based on the user logged in to the RCU. For example, actions can be allowed or limited based on a role (e.g., administrator, teacher, student, etc.) of the user. As another example, the user interface elements can be arranged based on whether the user is right-handed or left-handed.

In the foregoing specification, embodiments of the invention have been described with reference to numerous specific details that can vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of customizing contextual controls of a remote-control unit having a plurality of user interface elements, comprising:
   receiving, by a processor within the remote-control unit, context information from an integrated output device that includes an output mechanism, the context information being related to an active application being run on the integrated output device and an active object being presented by the active application to the output mechanism;
   determining, by the processor, a set of actions that can be performed on the active object within the active application;
   dynamically mapping, by the processor, one or more actions of the set of actions to one or more user interface elements of the plurality of user interface elements of the remote-control unit based on the context information, comprising:
   determining a most frequently performed action within the set of actions based on a usage history of a user or group of users;
   determining a most frequently selected user interface element within the plurality of user interface elements based on the usage history; and
   mapping the most frequently performed action to the most frequently selected user interface element;
   receiving, after the mapping, a selection of a user interface element of the one or more user interface elements; and
   sending a request from the remote-control unit to the integrated output device specifying an action mapped to the user interface element to be performed on the active object and the active application.

2. The method of claim 1, wherein the plurality of user interface elements comprises one or more physical control elements comprising at least one of a button, a scroll wheel, a dial, or a rocker switch.

3. The method of claim 1, wherein the remote-control unit comprises a touchscreen and wherein the plurality of user interface elements comprise a plurality of predetermined touchscreen gestures in a predetermined layout.

4. The method of claim 1, wherein the remote-control unit comprises a plurality of motion sensors and a plurality of angular rate sensors and wherein the plurality of user interface elements comprises a plurality of motion gestures that indicate motion of the remote-control unit.

5. The method of claim 1, wherein the remote-control unit comprises a microphone and wherein dynamically mapping the one or more actions to the one or more user interface elements comprises determining that the remote-control unit is in a voice input mode, wherein the one or more user interface elements are predetermined utterances spoken at predetermined volume ranges.

6. The method of claim 1, wherein the active application is configured with an extension or plugin that is configured to provide the context information to the remote-control unit.

7. The method of claim 1, wherein the context information includes a list of applications installed on the integrated output device and a set of actions that can be performed by each of the applications in the list.

8. The method of claim 1, wherein the context information comprises a current position within the active object and the one or more actions comprise at least one action for navigating within the active object based on the current position.

9. The method of claim 1, wherein:
the active application presents a complex object having a hierarchy,
the active object is at a particular level of the hierarchy, and
the method further comprises mapping at least one action of navigating to a different level of the hierarchy to at least one user interface elements of the plurality of user interface elements of the remote-control unit.

10. The method of claim 1, wherein:
the active application presents a layered object having a plurality of layers of content being presented at a same position on the integrated output device,
the active object is a first layer of content within the plurality of layers of content,
the method further comprises mapping a set of layer manipulation actions to a set of user interface elements of the remote-control unit, and
the set of layer manipulation actions comprise at least one of turning off display of the first layer of content, turning on display of the first layer of content, navigating to a second layer of content within the plurality of layers of content, rearranging an order of the plurality of layers of content.

11. The method of claim 1, wherein receiving the context information comprises periodically querying the integrated output device for the context information.

12. The method of claim 1, wherein:
the active object is a multi-media object comprising a set of embedded objects,
the one or more actions includes a specific action of navigating to a selected embedded object within the set of embedded objects, and
the method further comprises determining a new set of actions that can be performed on the selected embedded object in response to selection of a user interface element mapped to the specific action and dynamically mapping the new set of actions to the one or more user interface elements.

13. The method of claim 12, wherein:
the active object is a web page or presentation document, the selected embedded object is a video object or audio object, and
the one or more actions include at least one of a play control, a pause control, a rewind control, a fast forward control, a zoom-in or a volume-up, or a zoom-out or a volume-down.

14. The method of claim 12, wherein the plurality of user interface elements comprises a control for navigating from the selected embedded object back to the active object.

15. The method of claim 1, wherein receiving the context information from the integrated output device comprises receiving the context information from a dongle coupled to the integrated output device and wherein sending the request from the remote-control unit to the integrated output device comprises sending the request to the dongle.

16. A remote-control unit, comprising:
a processor; and
a memory storing instructions which, when executed by the processor, cause performance of a method of managing human-computer interaction, the method comprising:
receiving context information from an integrated output device that includes an output mechanism, the context information being related to an active application being run on the integrated output device and an active object being presented by the active application to the output mechanism;
determining, by the processor, a set of actions that can be performed on the active object within the active application;
dynamically mapping, by the processor, one or more actions of the set of actions to one or more user interface elements of a plurality of user interface elements of the remote-control unit based on the context information, comprising:
determining a most frequently performed action within the set of actions based on a usage history of a user or group of users;
determining a most frequently selected user interface element within the plurality of user interface elements based on the usage history; and
mapping the most frequently performed action to the most frequently selected user interface element;
receiving, after the mapping, a selection of a user interface element of the one or more user interface elements; and
sending a request from the remote-control unit to the integrated output device specifying an action mapped to the user interface element to be performed on the active object and the active application.

17. The remote-control unit of claim 16, wherein:
the active object is a multi-media object comprising a set of embedded objects,
the one or more actions includes a specific action of navigating to a selected embedded object within the set of embedded objects, and
the method further comprises determining a new set of actions that can be performed on the selected embedded object in response to selection of a user interface element mapped to the specific action and dynamically mapping the new set of actions to the one or more user interface elements.

18. The remote-control unit of claim 16, wherein:
the active application presents a complex object having a hierarchy,
the active object is at a particular level of the hierarchy, and the method further comprises mapping at least one action of navigating to a different level of the hierarchy to at least one user interface elements of the plurality of user interface elements of the remote-control unit.

19. One or more non-transitory storage media storing instructions which, when executed by one or more computing devices, cause performance of a method of customizing contextual controls of a remote-control unit having a plurality of user interface elements, the method comprising:

receiving, by a processor within the remote-control unit, context information from an integrated output device that includes an output mechanism, the context information being related to an active application being run on the integrated output device and an active object being presented by the active application to the output mechanism, the active object being a multi-media object comprising a set of embedded objects;

determining, by the processor, a set of actions that can be performed on the active object within the active application;

dynamically mapping, by the processor, one or more actions of the set of actions to one or more user interface elements of the plurality of user interface elements of the remote-control unit based on the context information, the one or more actions including a specific action of navigating to a selected embedded object within the set of embedded objects;

receiving, after the mapping, a selection of a user interface element of the one or more user interface elements, the user interface element being mapped to the specific action;

sending a request from the remote-control unit to the integrated output device specifying the specific action to be performed on the active object and the active application;

determining a new set of actions that can be performed on the selected embedded object in response to the selection;

dynamically mapping the new set of actions to the one or more user interface elements.

* * * * *